US012340644B2

(12) United States Patent
Wilson et al.

(10) Patent No.: US 12,340,644 B2
(45) Date of Patent: Jun. 24, 2025

(54) SYSTEMS AND METHODS FOR MANAGING PUBLICLY ACCESSIBLE AMENITIES

(71) Applicant: Throne Labs, Inc., Charlottesville, VA (US)

(72) Inventors: Fletcher Wilson, Charlottesville, VA (US); Benjamin Clark, Charlottesville, VA (US); Oleksandr Novikov, Kyiv (UA); Jessica Heinzelman, Charlottesville, VA (US); Shyanne Telfer, Charlottesville, VA (US); Al Barrientos, Charlottesville, VA (US); Juan Paz, Charlottesville, VA (US); Kyle Visner, Charlottesville, VA (US); William Gibbs, Charlottesville, VA (US); Max Cerami, Charlottesville, VA (US)

(73) Assignee: Throne Labs, Inc., Charlottesville, VA (US)

( * ) Notice: Subject to any disclaimer, the term of this patent is extended or adjusted under 35 U.S.C. 154(b) by 0 days.

(21) Appl. No.: 18/073,128

(22) Filed: Dec. 1, 2022

(65) Prior Publication Data

US 2024/0185661 A1 Jun. 6, 2024

(51) Int. Cl.
*G07C 9/32* (2020.01)

(52) U.S. Cl.
CPC .................................... *G07C 9/32* (2020.01)

(58) Field of Classification Search
None
See application file for complete search history.

(56) References Cited

U.S. PATENT DOCUMENTS

| | | | | |
|---|---|---|---|---|
| 8,364,546 | B2 * | 1/2013 | Yenni | H04L 67/12 702/56 |
| 9,987,520 | B2 | 6/2018 | Shavit et al. | |
| 10,066,379 | B2 | 9/2018 | Schomburg et al. | |
| 10,185,921 | B1 | 1/2019 | Heller et al. | |
| 10,430,737 | B2 * | 10/2019 | Yenni | G06Q 10/087 |

(Continued)

FOREIGN PATENT DOCUMENTS

| | | | | |
|---|---|---|---|---|
| CA | 2619290 | A1 * | 8/2008 | A47K 5/1217 |
| CA | 3106994 | A1 * | 2/2020 | E03C 1/00 |

(Continued)

*Primary Examiner* — Fekadeselassie Girma
(74) *Attorney, Agent, or Firm* — Merchant & Gould P.C.

(57) ABSTRACT

Systems and methods for amenity management are described. An amenity management system can include a plurality of amenities and an amenity manager communicatively coupled to the plurality of amenities. The amenity manager can implement a user authentication module configured to generate a user profile including user authentication data and an access status, selectively provide access to the plurality of amenities based on the access status, and update the user profile to include amenity use data for each instance a particular amenity of the plurality of amenities is accessed by the user profile, an amenity status tracking module configured to receive cleanliness data of each of the plurality of amenities, and a user management module configured to update the access status of the user profile based on the user authentication data, the amenity use data, and the cleanliness data.

20 Claims, 18 Drawing Sheets

(56) References Cited

U.S. PATENT DOCUMENTS

| | | | | |
|---|---|---|---|---|
| 10,475,263 | B1 * | 11/2019 | Heller | G07C 9/38 |
| 10,565,531 | B1 | 2/2020 | Heller | |
| 10,822,784 | B2 | 11/2020 | Schomburg et al. | |
| 10,943,420 | B1 | 3/2021 | Heller et al. | |
| 10,944,828 | B2 | 3/2021 | Heller | |
| 10,977,281 | B2 * | 4/2021 | Bartram | G06Q 10/10 |
| 11,240,649 | B2 | 2/2022 | Heller | |
| 11,336,728 | B2 | 5/2022 | Heller | |
| 11,473,284 | B2 | 10/2022 | Schomburg et al. | |
| 11,540,671 | B2 | 1/2023 | Schomburg et al. | |
| 11,770,691 | B2 | 9/2023 | Heller et al. | |
| 11,954,958 | B2 * | 4/2024 | Heller | G06K 7/1417 |
| 2007/0163036 | A1 | 7/2007 | Holmstadt | |
| 2009/0119142 | A1 * | 5/2009 | Yenni | H04L 67/12<br>705/7.15 |
| 2012/0154169 | A1 * | 6/2012 | Hoekstra | G07F 9/009<br>340/870.01 |
| 2013/0124247 | A1 * | 5/2013 | Yenni | H04L 67/12<br>705/7.15 |
| 2014/0274949 | A1 * | 9/2014 | Scavone | A61K 31/724<br>514/54 |
| 2015/0088570 | A1 * | 3/2015 | Yenni | G06Q 10/06<br>705/7.15 |
| 2015/0177917 | A1 * | 6/2015 | Hoekstra | G06Q 10/10<br>715/771 |
| 2017/0306608 | A1 * | 10/2017 | Goldberg | G08B 21/182 |
| 2019/0320515 | A1 * | 10/2019 | Sadwick | F21V 23/0471 |
| 2020/0392710 | A1 * | 12/2020 | Saruta | G06Q 50/10 |
| 2021/0161482 | A1 * | 6/2021 | Aizawa | A61B 5/7278 |
| 2021/0306460 | A1 * | 9/2021 | Doumar | H04L 51/02 |
| 2022/0027824 | A1 * | 1/2022 | Ogawa | G06Q 50/10 |
| 2022/0273837 | A1 * | 9/2022 | Paul | A61L 2/085 |
| 2023/0060626 | A1 * | 3/2023 | Stevens | G07C 9/00174 |
| 2023/0070807 | A1 * | 3/2023 | Bachwich | G06T 7/0002 |
| 2023/0136174 | A1 | 5/2023 | Schomburg et al. | |
| 2024/0016455 | A1 * | 1/2024 | Pinczuk | A61B 5/7275 |
| 2024/0129965 | A1 | 4/2024 | Wang et al. | |
| 2024/0144764 | A1 | 5/2024 | Heller | |
| 2024/0153334 | A1 * | 5/2024 | Everton | G06Q 30/0237 |
| 2024/0185661 | A1 * | 6/2024 | Wilson | G07C 9/32 |

FOREIGN PATENT DOCUMENTS

| | | | | | |
|---|---|---|---|---|---|
| CA | 3120745 | A1 | * | 5/2020 | G06Q 10/063114 |
| CA | 3001714 | C | * | 9/2022 | G06F 21/45 |

* cited by examiner

SYSTEMS AND METHODS FOR MANAGING PUBLICLY ACCESSIBLE AMENITIES

TECHNICAL FIELD

The present disclosure relates to public amenities and, in particular, to managing user access to and interaction with public amenities such as smart, portable bathroom facilities.

BACKGROUND

Many types of public amenities are provided that provide the members of the public with various services. For example, public restrooms are provided through the world in various locations such as parks and other outdoor city areas, job sites and concerts, festivals, campgrounds and other outdoor gatherings, etc. In many circumstances, such public restrooms are provided as portable restrooms that are not connected to water or sewage and can be temporarily placed in a location or at an event and removed. These portable restrooms are often unpleasant due to the storage of waste in the restroom, may be unsanitary due to irregularly cleaning and can be costly to acquire and maintain. As a result, people are often unable to find a bathroom when they need one and if there is an available portable restroom the experience is often unpleasant. Public amenities such as public restrooms are also typically accessed freely by users in an anonymous fashion. There is therefore little individual user accountability that can lead to mistreatment of such amenities that further leads to unpleasant conditions in such amenities.

SUMMARY

Systems and methods for amenity management are described. An amenity management system can include a plurality of amenities and an amenity manager communicatively coupled to the plurality of amenities. The amenity manager can implement a user authentication module configured to generate a user profile including user authentication data and an access status, selectively provide access to the plurality of amenities based on the access status, and update the user profile to include amenity use data for each instance a particular amenity of the plurality of amenities is accessed by the user profile, an amenity status tracking module configured to receive cleanliness data of each of the plurality of amenities, and a user management module configured to update the access status of the user profile based on the user authentication data, the amenity use data, and the cleanliness data.

In one aspect, the present disclosure provides for an amenity management system. The amenity management system includes a plurality of amenities and an amenity manager communicatively coupled to the plurality of amenities and including computing hardware of at least one processor and memory operably coupled to the at least one processor. The system further comprises instructions that, when executed on the amenity manager, cause the amenity manager to implement a user authentication module, an amenity status tracking module, and a user management module. The user authentication module is configured to generate a user profile including user authentication data and an access status, selectively provide access to the plurality of amenities based on the access status, and update the user profile to include amenity use data for each instance a particular amenity of the plurality of amenities is accessed by the user profile. The amenity status tracking module is configured to receive cleanliness data of each of the plurality of amenities, and the user management module is configured to update the access status of the user profile based on the user authentication data, the amenity use data, and the cleanliness data.

In another aspect, the present disclosure provides for a method for managing a plurality of amenities. The method can comprise generating a user profile including user authentication data and an access status, selectively providing access to the plurality of amenities based on the access status, updating the user profile to include amenity use data for each instance a particular amenity of the plurality of amenities is accessed by the user profile, receiving cleanliness data for each of the plurality of amenities, and updating the access status of the user profile based on the user authentication data, the amenity use data, and the cleanliness data.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
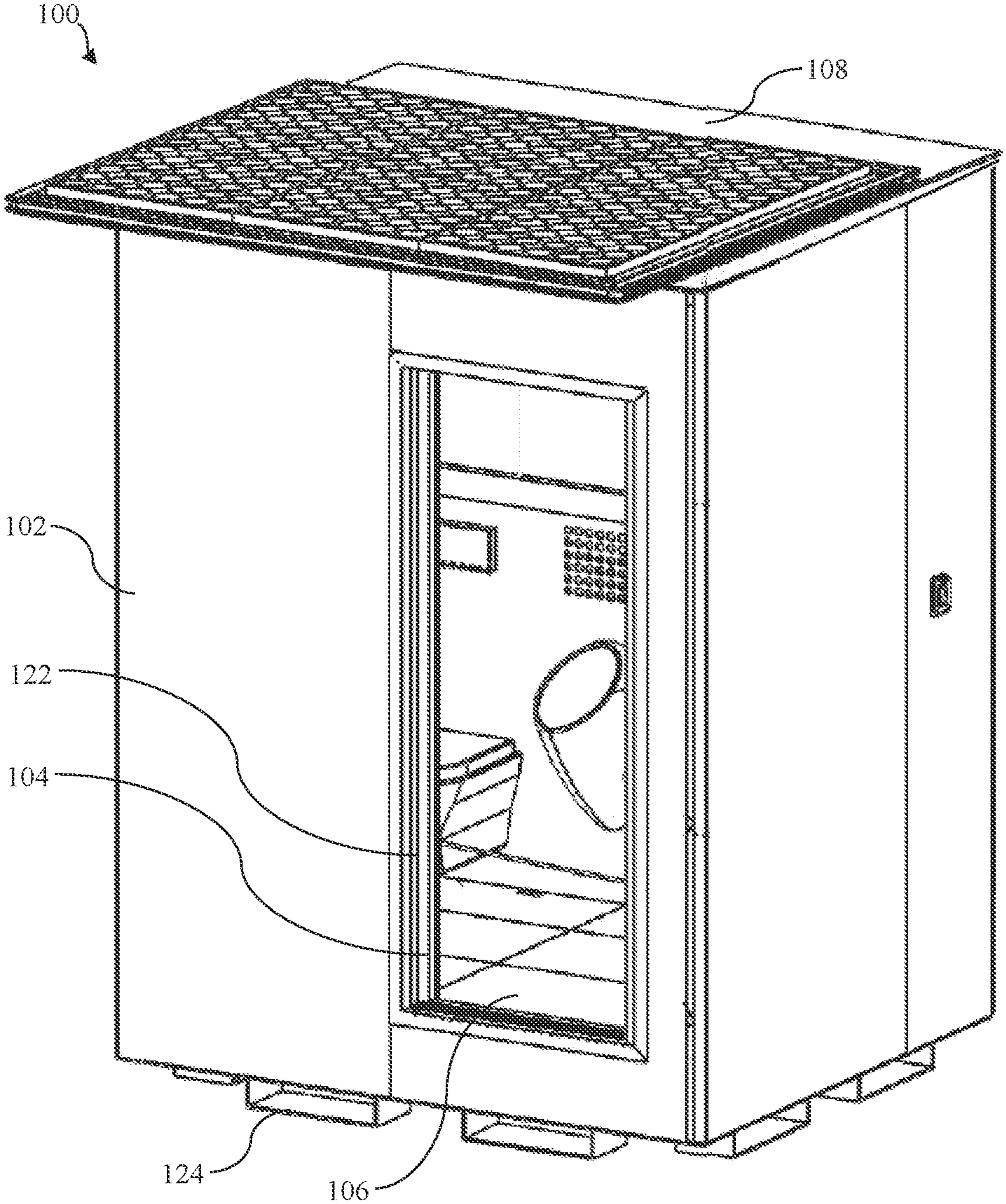
FIG. 1A is a front perspective view of a bathroom according to an embodiment.
Figure 1C:
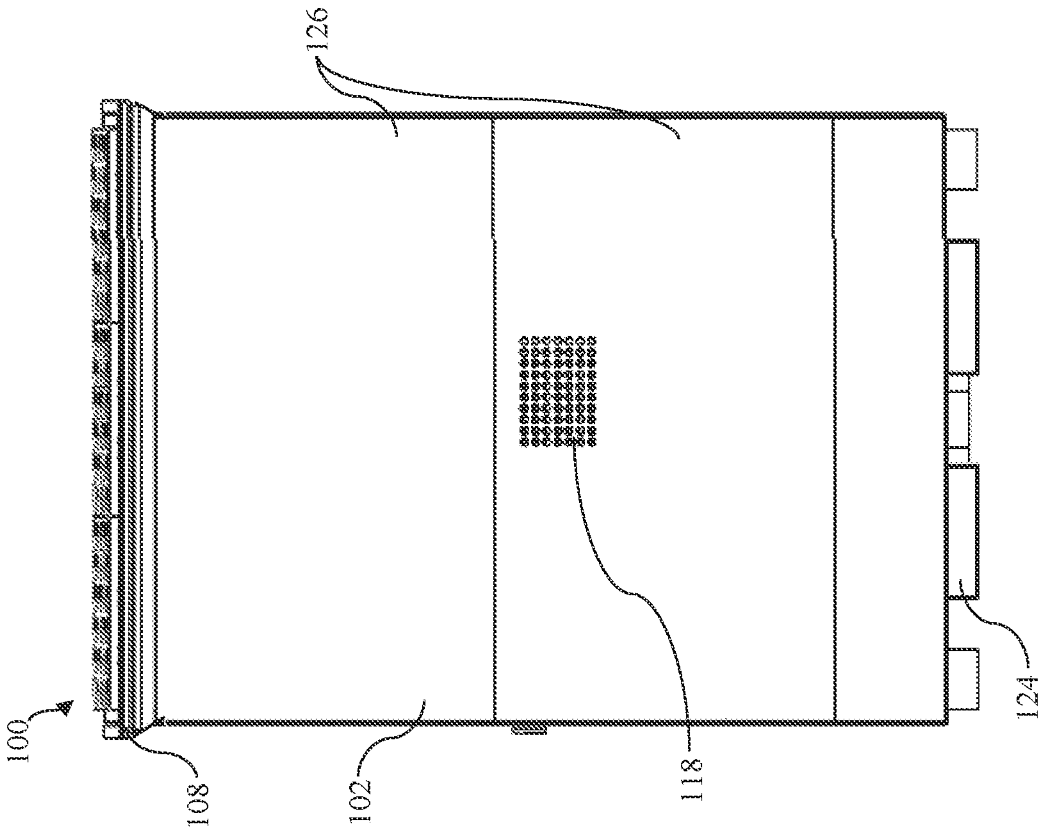
FIG. 1C is a back view of the bathroom of FIG. 1A.
Figure 1B:
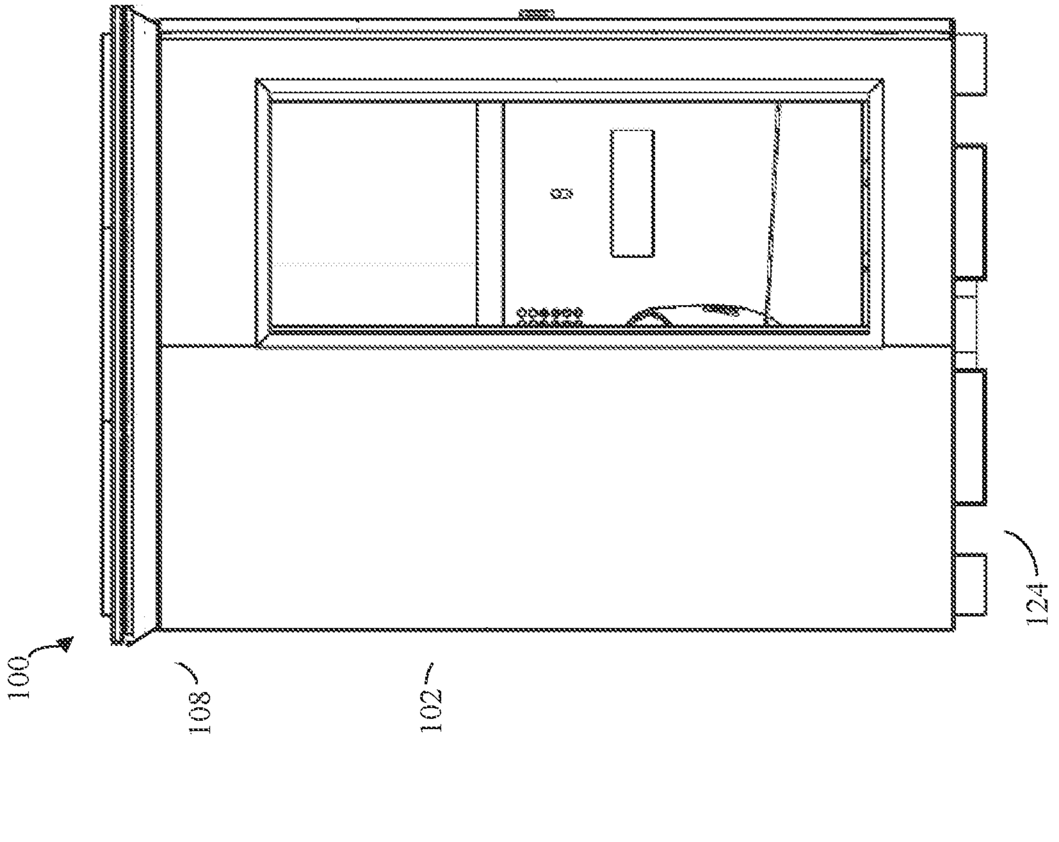
FIG. 1B is a front view of the bathroom of FIG. 1A.
Figure 1E:
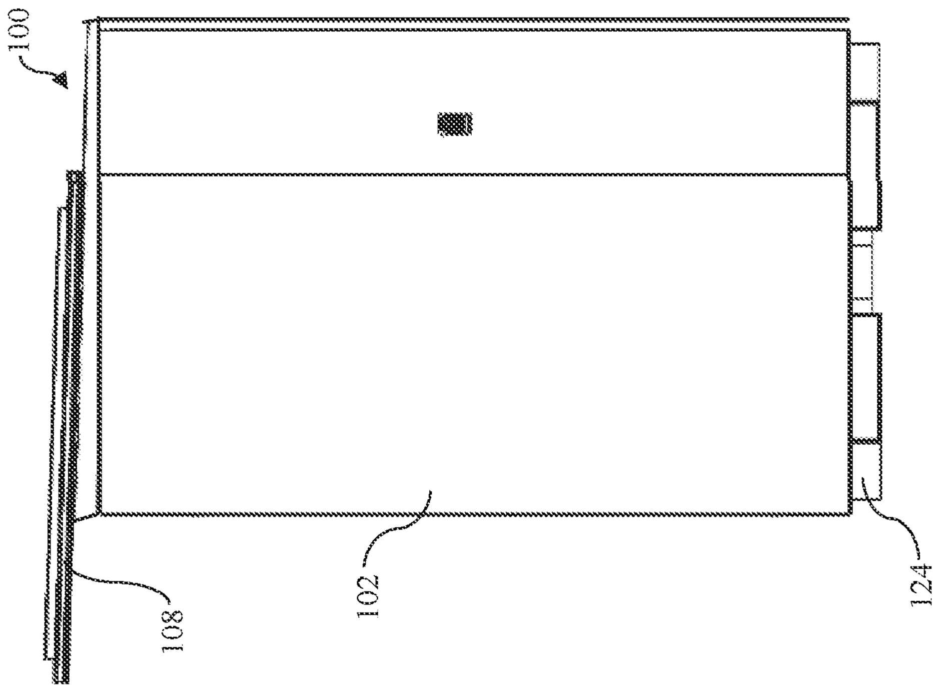
FIG. 1E is a right view of the bathroom of FIG. 1A.
Figure 1D:
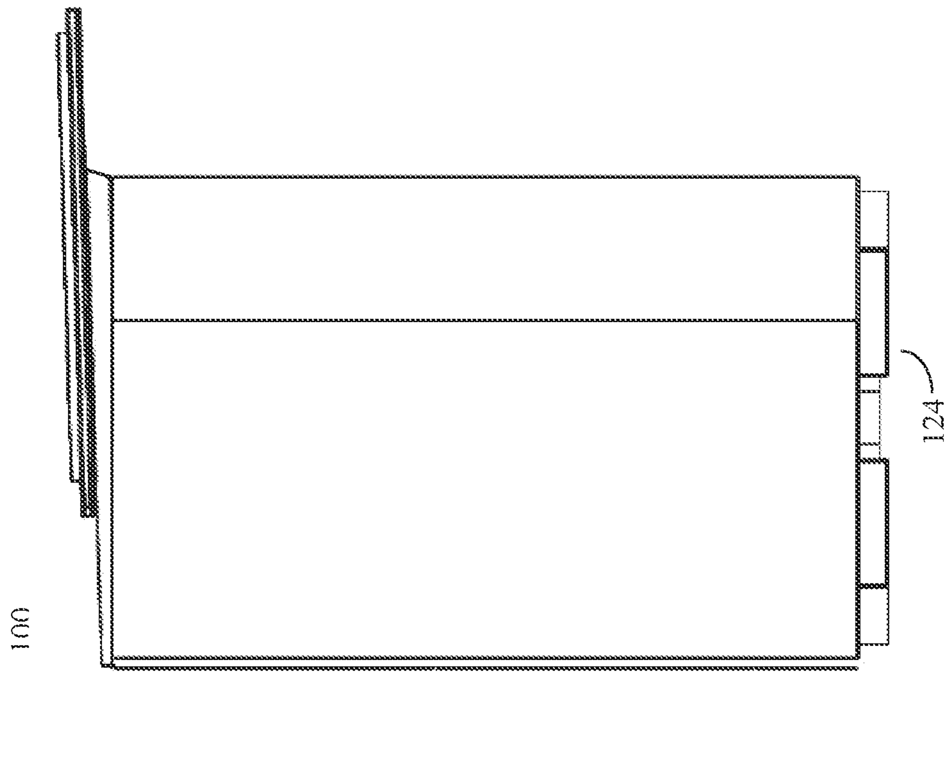
FIG. 1D is a left view of the bathroom of FIG. 1A.
Figure 1G:
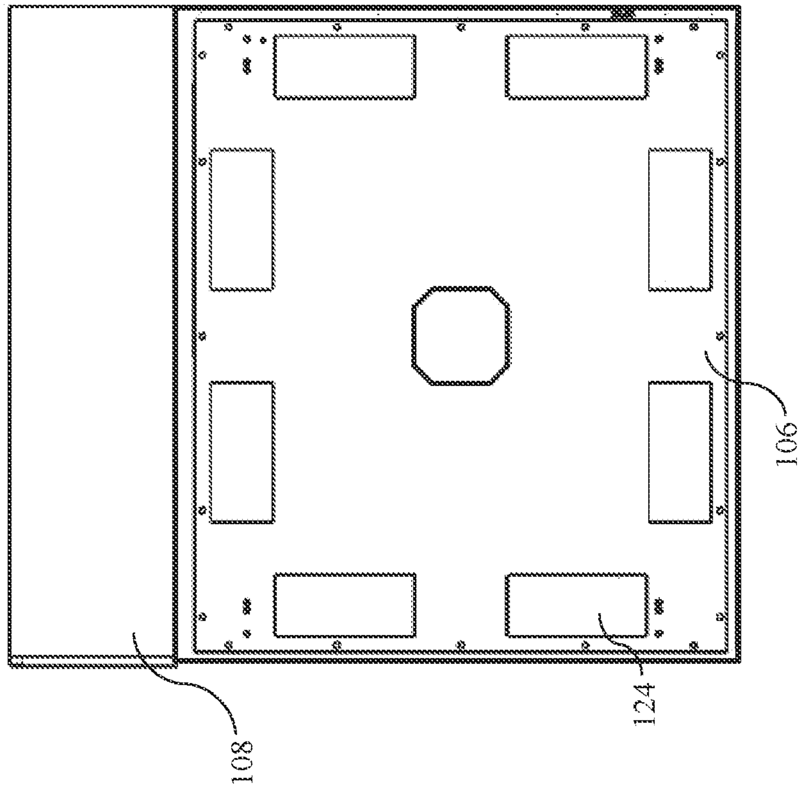
FIG. 1G is a bottom view of the bathroom of FIG. 1A.
Figure 1F:
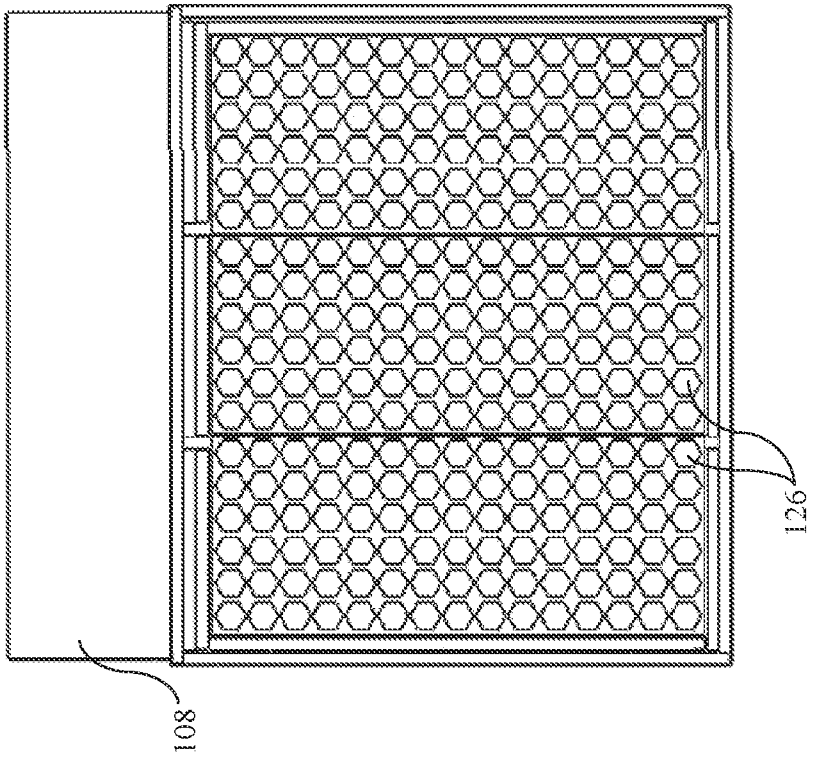
FIG. 1F is a top view of the bathroom of FIG. 1A.
Figure 1I:
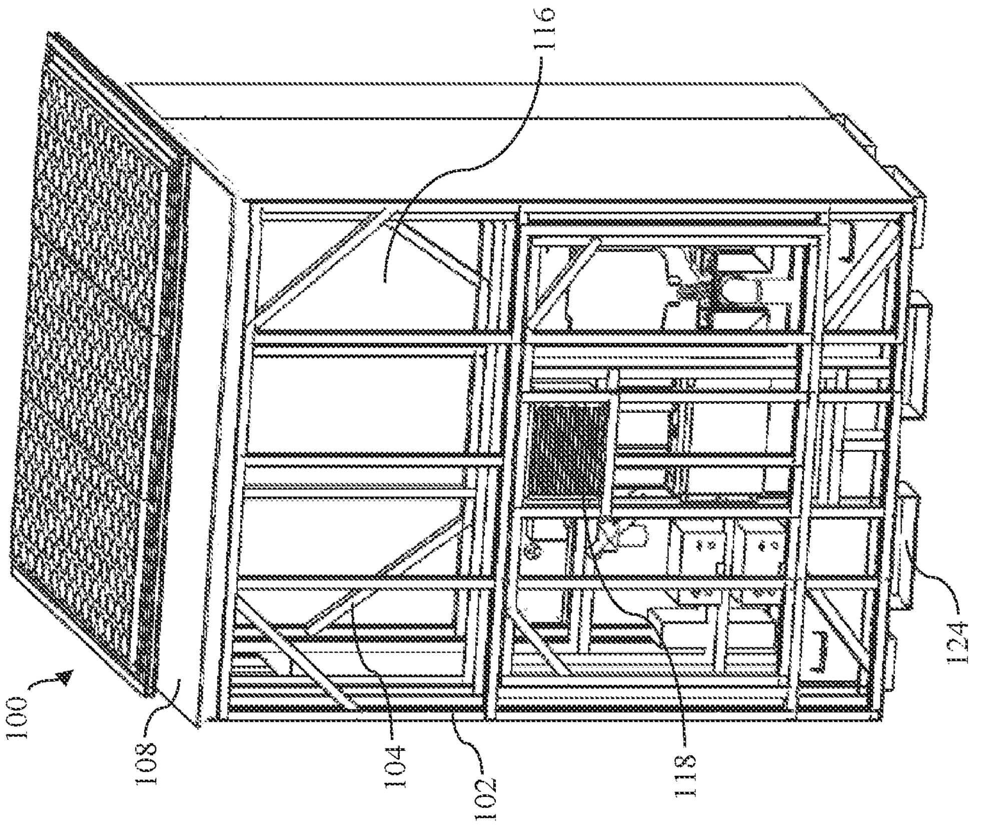
FIG. 1I is a partial back perspective view of the bathroom of FIG. 1A.
Figure 1H:
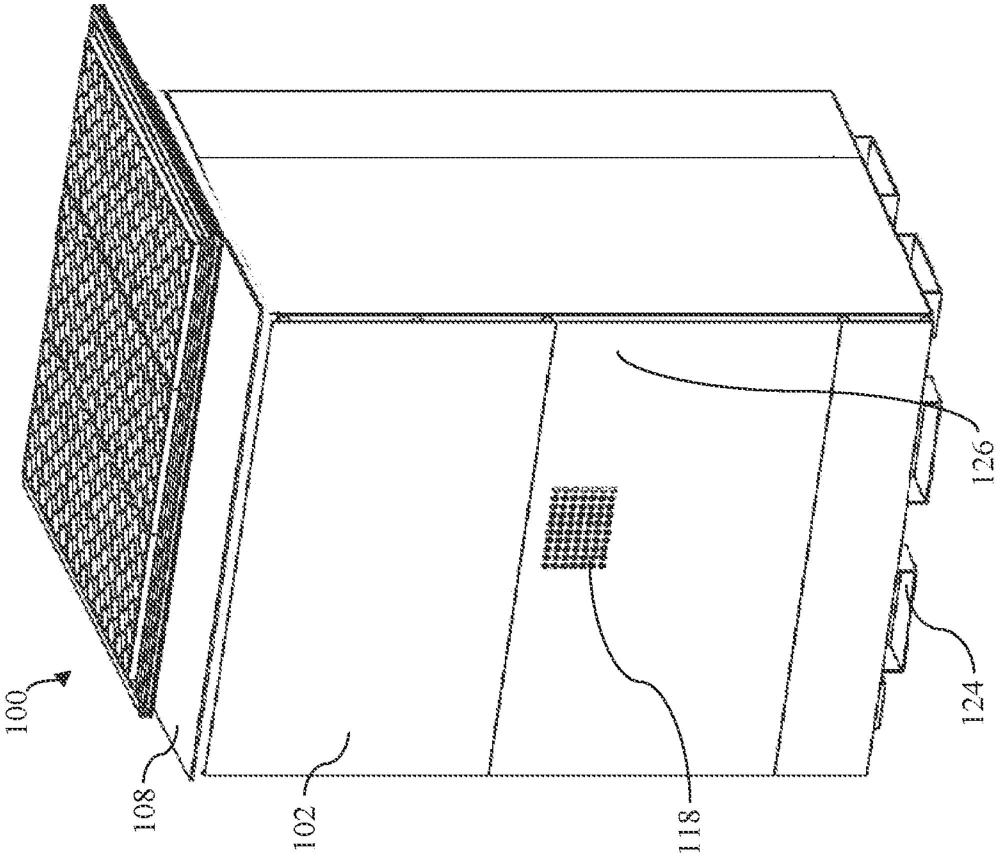
FIG. 1H is a back perspective view of the bathroom of FIG. 1A.
Figure 1J:
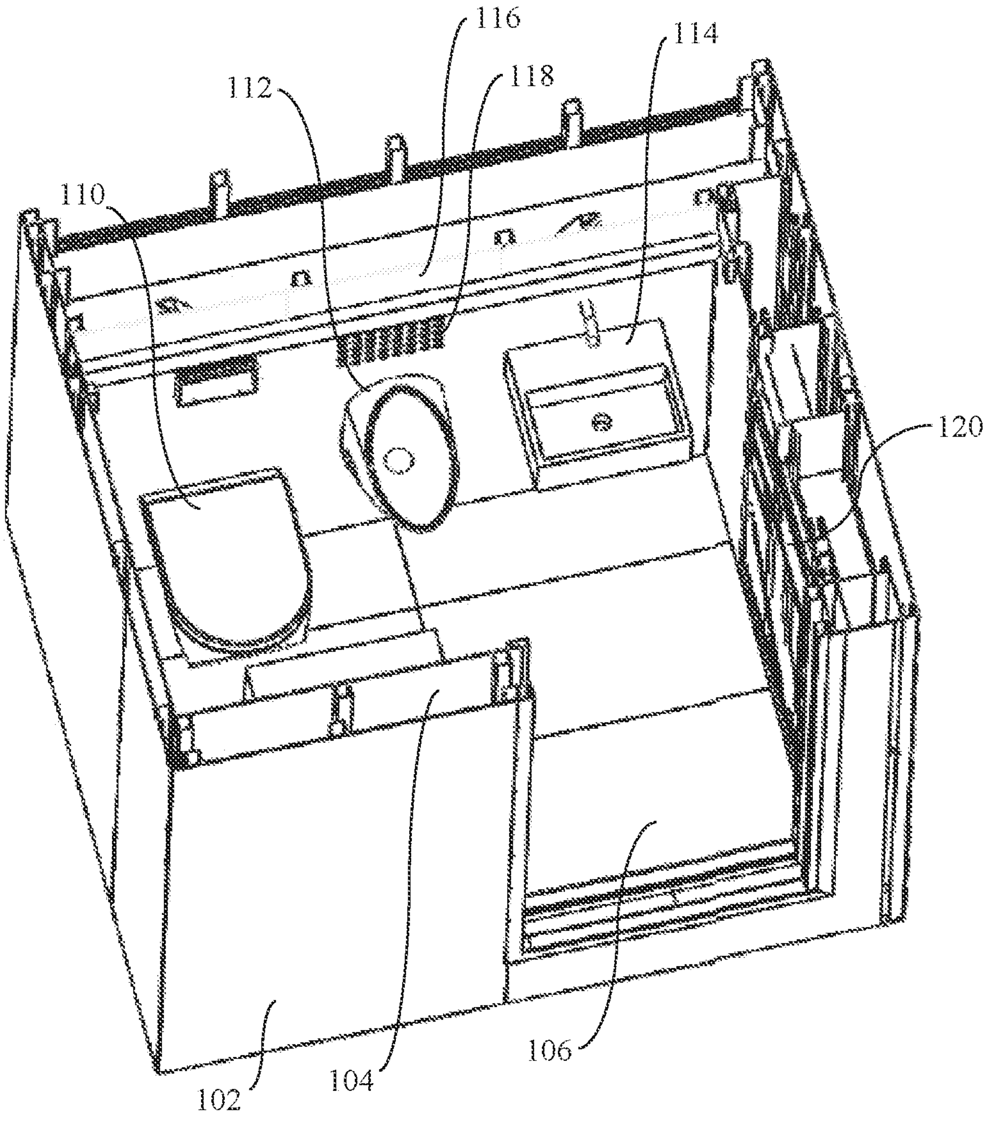
FIG. 1J is a partial top-down view of the bathroom of FIG. 1A.
Figure 1K:
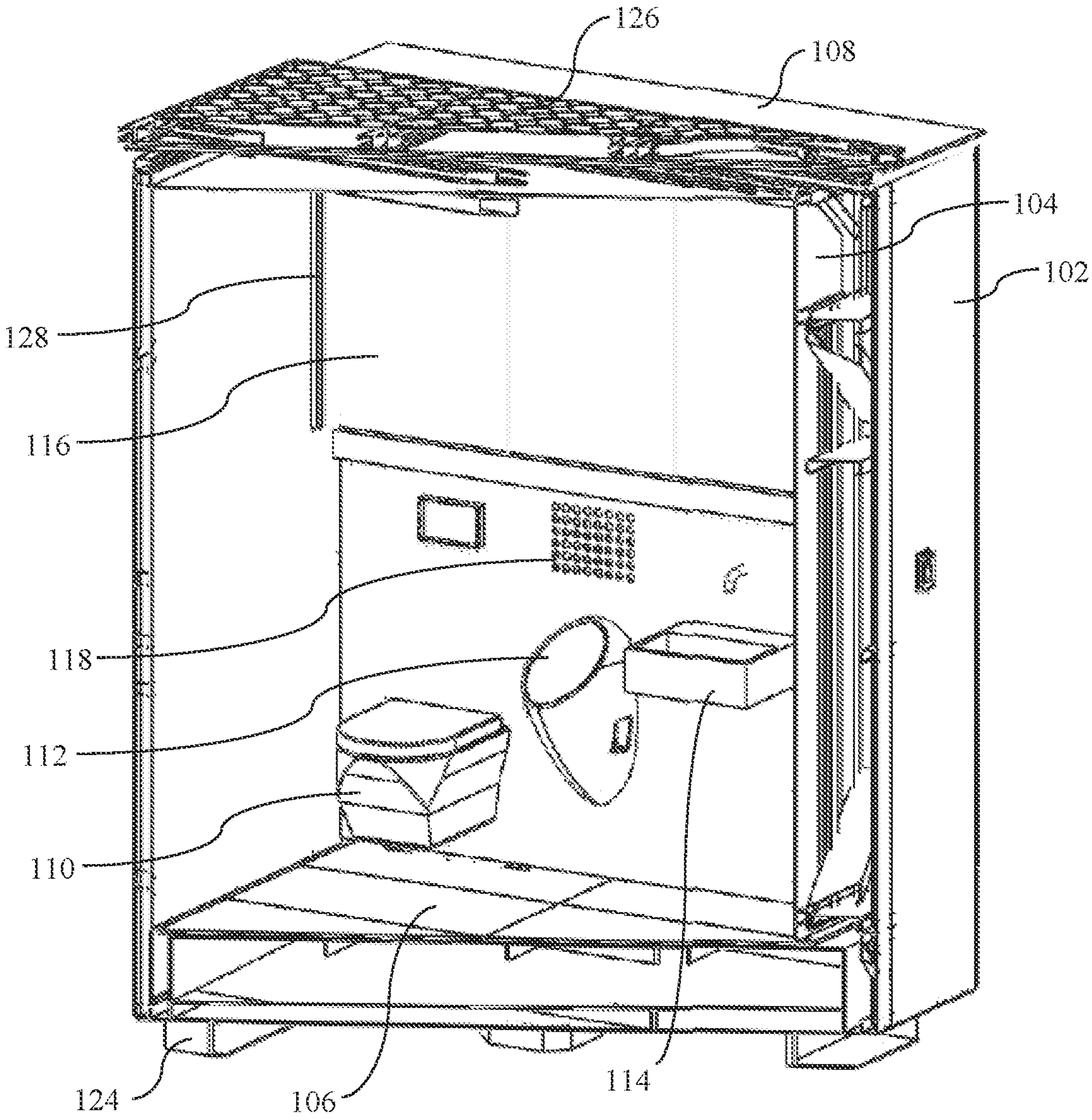
FIG. 1K is a partial front perspective view of the bathroom of FIG. 1A.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1A-1K, a portable bathroom 100 with smart features is depicted according to an embodiment. Bathroom 100 generally comprises exterior walls 102, interior walls 104, floor 106, and roof 108 defining an enclosed space that includes bathroom elements. Bathroom elements can include toilet 110, urinal 112, sink 114, mirror 116, HVAC system 118, cleaning supply compartment 120, and lights 128. Entry to the enclosed space is controlled by door 122.

In embodiments, door 122 is a pocket door that is configured to slide between exterior walls 102 and interior walls 104 when in an open position. Such embodiments allow for more convenient use of space in the interior of bathroom 100 and improved safety as users approaching an occupied bathroom 100 are not at risk of being hit by an opening door. Locking and opening of door 122 can be done electronically such that contactless entry and exit is possible.

The space between exterior walls 102 and interior walls 104, below floor 106, and above roof 108 can be configured to house a freshwater tank, a graywater tank, and a wastewater tank for use with a plumbing system. In embodiments, the freshwater tank can be located above the bathroom elements to facilitate a strong flow of water and the wastewater tank can be located below the bathroom elements to receive sewage and used water. In other embodiments, the freshwater tank at or below the bathroom elements, and an electric pump is utilized to facilitate a strong flow of water. In other embodiments, the wastewater tank can be located at or above the bathroom elements, with use of a macerating pump to break down sewage and move it to elevated wastewater tank.

One or more exterior walls 102 can comprise panels 126 that can be independently removed to provide access to components, such as the graywater tank or HVAC system 118, stored between exterior walls 102 and interior walls 104. In embodiments, removal of panels 126 can be secured with a locking mechanism that requires user identification or presentation of a key before access is permitted.

Floor 106 can be raised by supports 124 such that the enclosed space has clearance from the ground. Supports 124 can allow for more flexibility in where bathroom 100 may be deployed. In embodiments, supports 124 can be spaced across floor 106 or made hollow to allow for secure transport by a forklift or other means. In some embodiments, bathroom 100 includes adjustable feet at or proximate to the corners of the structure base. These adjustable feet allow for unit to be placed on uneven ground. In embodiments the adjustable feet provide support for lateral forces. The adjustable feet can include jacks to transition rotational motion into translational motion such that a hand drill or similar device can be used to raise or lower the adjustable feet (and accordingly the bathroom). In some embodiments supports 124 could be removable, to provide tipping support when on a fork. In such embodiments, during placement supports 124 can be removed to reduce the final resting height of the floor compared to the ground under the amenity.

Roof 108 can extend past exterior walls 102 from one or more sides to provide shade and cover from precipitation. In embodiments, roof 108 can optionally incorporate or otherwise support one or more solar panels 126 configured to power a battery of bathroom 100. Solar panels may also be affixed to roof extensions past the exterior wall. Solar panels may also be affixed to vertically oriented poles with articulation permitted by a hinging bracket affixed to the poles. The battery can be used to power electric elements of bathroom 100, including operation of door 122, lights 128, audio systems, smart locks, motors, actuators, valves, pumps, HVAC systems, and one or more sensing modules configured to record data and detect status conditions of bathroom 100. One or more sensing modules can include weight sensors, light-based sensors, temperature sensors, cameras, microphones, and the like.

Power can be conserved by turning off the one or more lights 128, limiting the transmission of data packets from bathroom 10, limiting power supplied to the HVAC unit, limiting power supplied to one or more sensing modules, or limitation of any power consuming feature when the bathroom is not occupied. In embodiments, bathroom 100 can enter a low-power or sleep state after a predetermined period of time, such as five minutes without occupancy, or during certain times of day. The low-power or sleep state can also be entered when a state of charge sensors drop below a certain configurable threshold, or when a combination of current charge status, predicted energy needs, and predicted energy input from charging sources falls below a threshold, warranting power conservation. For example, if solar energy is used weather predictions can be used to determine likely charge over a period of time, which can be considered the predicted energy input for the system.

In embodiments where roof 108 includes an overhang past the exterior wall 102 that includes a door 122, a sensing module can be placed on the overhang, or on the door frame exterior to the door, such that when door 122 is in an open position data regarding the state of the enclosed space can be collected. Placement of such a sensing module, such as a camera, can enable data to be collected from the interior of bathroom 100 while complying with privacy regulations.

In some embodiments, a microphone can be placed in the utility wall near the toilet drainpipe to detect sounds of an improperly flushing toilet (such as a clog). Machine learning can be employed to learn the sounds of proper and improperly flushing toilets over time by pairing sensing results with customer or service member validations of certain real world events.

In some embodiments, a microphone can be placed on the interior of bathroom 100, and machine learning algorithms are trained to detect the sounds or motions of vandalism or other abuse of the portable bathroom, such as breaking, pounding, attempted tipping, tampering with sensors, drug consumption, sexual activity, or other nefarious activities, or signals of duress from a user which could require assistance from authorities.

Accordingly, embodiments of the present disclosure provide for a solar-powered and self-contained portable bathroom 100 that does not require any on-site construction. Bathroom 100 includes the capability to have running water and robust ventilation that can be accessed with touchless entry and exit to provide a pleasant user experience. No connections to external power, water or sewage are required.

Figure 2:
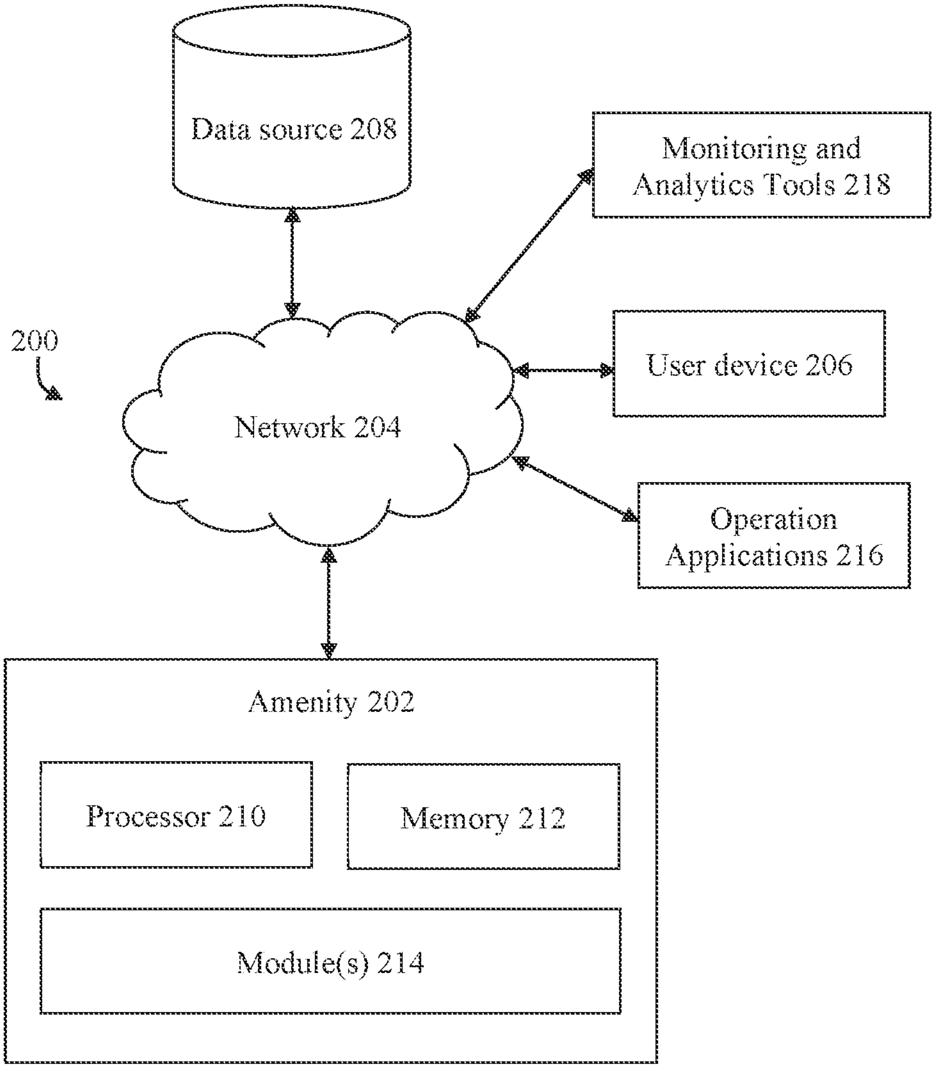
FIG. 2 is a block diagram of a system for managing publicly accessible amenities, according to an embodiment.

Referring to FIG. 2, a block diagram of a system 200 for managing publicly accessible amenities is depicted, according to an embodiment. System 200 can be used to permit user access to amenities and generally comprises amenity 202, network 204, user device 206, data source 208, operation applications 216, and monitoring and analytics tools 218.

In embodiments, amenity 202 can be a smart, portable bathroom such as bathroom 100. Amenity 202 generally comprises a processor 210, memory 212, and at least one module 214. Examples of amenity 202 include restrooms, vending machines, vehicles, storage lockers, changing rooms, photo booths, showers, temporary offices, phone booths, laundry pods, medical diagnostic booths, voting booths, breast pumping spaces, and the like. The term "amenity" will be used herein throughout for convenience but is not limiting with respect to the actual features, characteristics, or composition of any smart enclosure or system that could embody amenity 202.

Amenity 202 can be a permanent amenity. For example, existing amenities, such as permanent bathrooms (e.g., retail bathrooms, gas station bathrooms, etc.), can be outfitted or retrofit to include one or more of access control, user authentication, user feedback, and userbase management as will be described.

Processor 210 can be any programmable device that accepts digital data as input, is configured to process the input according to instructions or algorithms and provides results as outputs. In an embodiment, processor 210 can be a central processing unit (CPU) or a microcontroller or microprocessor configured to carry out the instructions of a computer program. Processor 210 is therefore configured to perform at least basic arithmetical, logical, and input/output operations.

Memory 212 can comprise volatile or non-volatile memory as required by the coupled processor 210 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, or optical disc storage, for example. The foregoing lists in no way limit the type of memory that can be used, as these embodiments are given only by way of example and are not intended to limit the scope of the present disclosure.

Module 214 refers to any hardware or software that is constructed, programmed, configured, or otherwise adapted to autonomously carry out a function or set of functions, such as detecting a user device 206 or communicating with data source 208. The term "module" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. Module 214 can also be implemented as a combination of the two, with certain functions facilitated by hardware alone, and other functions facilitated by a combination of hardware and software. In certain implementations, at least a portion, and in some cases, all, of module 214 can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module 214 can be realized in a variety of physically realizable configurations and should generally not be limited to any particular implementation exemplified herein, unless such limitations are expressly called out.

In embodiments, module 214 can itself be composed of more than one sub-modules, each of which can be regarded as a module in its own right. Moreover, in the embodiments described herein, each of module 214 corresponds to a defined autonomous functionality; however, it should be understood that in other contemplated embodiments, each functionality can be distributed to more than one module. Likewise, in other contemplated embodiments, multiple defined functionalities may be implemented by a single module that performs those multiple functions, possibly alongside other functions, or distributed differently among a set of engines than specifically illustrated in the examples herein.

System 200 can be implemented irrespective of the number or type of module 214, although it can be beneficial in some embodiments to have module 214 arranged at a known position relative to the structure of amenity 202. In embodiments, module 214 can be within or outside the structure of amenity 202 or stored in a housing independent of amenity 202. For example, module 214 may be a scanner located external to bathroom 100 and configured to provide access to bathroom 100 upon detecting a QR code on user device 206. The position of module 214 external to amenity 202 can allow a module 214 configured to control user access to be used across several amenities.

Amenity 202 is configured to provide two-way data communication with network 204 via a wired or wireless connection. The specific design and implementation of an input/output module of amenity 202 can depend on the communications network(s) over which amenity 202 is intended to operate. Amenity 202 can, via network 204, access stored data from at least one data source 208.

Monitoring and analytics tools 218 are configured to provide administration capabilities over system 200. In embodiments, monitoring and analytics tools 218 can allow an administrator to control user access to system 200 based on a variety of user profile and amenity considerations as will be discussed.

In embodiments, network 204 can be in communication with a server, such as a cloud-based server, and serverless solutions, such as Lambdas or any other cloud based or self-hosted services, all of which include a memory and at least one data processor. In addition, the server can collect and retrieve data from one or more external sources, such as a variety of navigational services or user management services. The one or more external sources can assist the server with providing amenity 202 with information characterizing a user profile associated with user device 206 in real-time. In embodiments, the one or more external sources can collect a variety of data from amenity 202 that can include one or more of occupation status, cleanliness rating, amenity location, and the like.

User device 206 generally comprises processing and memory capabilities and can establish a wireless connection with network 204, communicate with network 204 using external services such as a proxy, or otherwise communicate to amenity 202, such as by Bluetooth, near-field communication (NFC), or the like. Examples of user device 206 include smartphones, tablets, laptop computers, wearable devices (e.g., smart watches or smart glasses), other consumer electronic devices or user equipment (UE), and the like. The term "user device" will be used herein throughout for convenience but is not limiting with respect to the actual features, characteristics, or composition of the or any device that could embody user device 206. In embodiments, user device 206 can run an instance of an application, such as operation applications 216, or user interface designed to facilitate user interaction with one or more features of amenity 202. In embodiments, user device 206 can be associated with one or more user profiles.

In embodiments, user device 206 can communicate with network 204 using Short Message Service (SMS) without running any additional software. Communication between user device 206 and network 204 can be established using any external or custom solutions, like SMS proxy services. Communication can be either unilateral or bilateral.

Data source 208 can be one or more general-purpose database management storage systems (DBMS). Data source 208 can be one or more relational or nonrelational DBMS as implemented by, for example, Oracle, IBM DB2, Microsoft SQL Server, PostgreSQL, MySQL, SQLite, Linux, or Unix solutions. Data source 208 can store one or more data sets associated with user devices 206 or associated with a user or amenities 202. In embodiments, data source 208 can be native to amenity 202 such that no connection to network 204 is necessary. In embodiments, data source 208 can receive data directly from amenities 202 through different cloud services.

One purpose of data source 208 is to store a plurality of navigational data that can map locations of one or more amenities 202 such that user device 206 can be provided directions to nearby amenities 202. Maps communicated to user device 206 can be an effective way to compare amenities and can include representations such as availability, business, cleanliness, parking availability, included internal amenities, accessibility information, temperature, recent service status, current length of queue, and any other features specific to amenities. In an embodiment, amenities can be identified by pins on a map with a cleanliness score represented by the color of each pin and estimated wait time displayed on each pin. In another embodiment, amenities can be identified by pins on a map, with availability represented by the color of each pin. In another embodiment, amenities can be identified by pins on a map, and further information about a particular amenity is displayed on a detail card, visible only when a pin is selected via touch screen interface or other means.

In embodiments users can add data such as new digital representations of external amenities, such as existing publicly available bathrooms, retail bathrooms, or other relevant amenities, to the data source 208 using user devices 206 with running an instance of operation applications 216 over the network 204. This user-generated content may be part of the system and have a similar visual representation in the app or user interface as the previously represented amenities or include an indication that that amenity was added by a user and not the company. User-generated content can also include adding any data related to newly added or existing amenities that will be publicly available, or available to certain users with specific access levels. This user generated data can include reviews, ratings, cleanliness scores, amenities location data, existence or absence of certain specific utilities (e.g., baby changing table, grab bars, toilet paper levels), or any other data relevant to an amenity. Input data may also include incident or safety reporting. Access to view the user generated amenities may be restricted to certain users with certain access permissions.

System 200 represents an improvement over conventional amenity management approaches that fail to leverage user identification and accountability and is therefore able to provide a more pleasant user experience. Navigational data can be used to help direct users to available amenities 202 and reduce wait times. Additionally, system 200 can alleviate cleanliness concerns of users by monitoring cleanliness levels of amenities and providing alerts to staff when operation or cleanliness conditions are not met. System 200 can utilize negative cleanliness data or communications stemming from sensors or direct user communication to be automatically removed from the map or digital representations of the amenity and put into an out of service mode, via external signage, to properly communicate to potential users of the unit's status, and the unit would be inaccessible to future users until service was provided to the amenity. System 200 further provides automated management of amenities 202 that can reduce overhead cost of maintaining amenities through data informed operational infrastructure.

User Identification and Authentication

Figure 3:
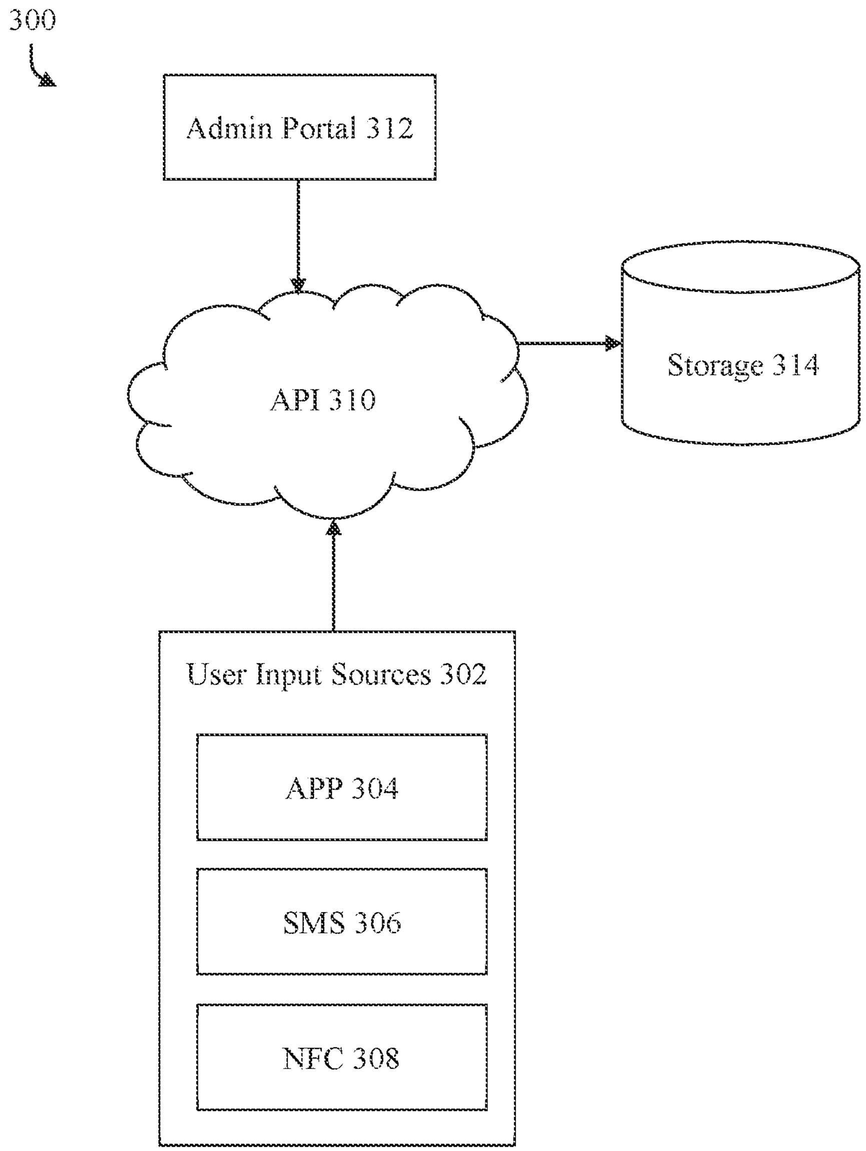
FIG. 3 is a block diagram of a user management module for managing publicly accessible amenities, according to an embodiment.

Referring to FIG. 3, a block diagram of user authentication and management module 300 is depicted according to an embodiment. User authentication and management module 300 can incorporate or otherwise use all elements of system 200 (e.g., network 204, application, data source 208), and includes user input sources 302, API 310, admin portal 312, and storage 314.

API 310, which can be any server or serverless solution, acts to process user requests from various types of user devices or user input sources 302. User input sources 302 include application 304, an SMS module 306, an NFC card 308, other physical card, or other devices or scannable images, such as a QR code. An example of a request that can be received from user input sources 302 is a request to access the amenity. Other example requests include requests to access certain interior compartments within the amenity that are controlled by a smart lock, such as cabinets containing consumable or other desirable supplies, a cleaning compartment, service access hatch, or requests to control certain actuators or sensors within the amenity.

Figure 4:
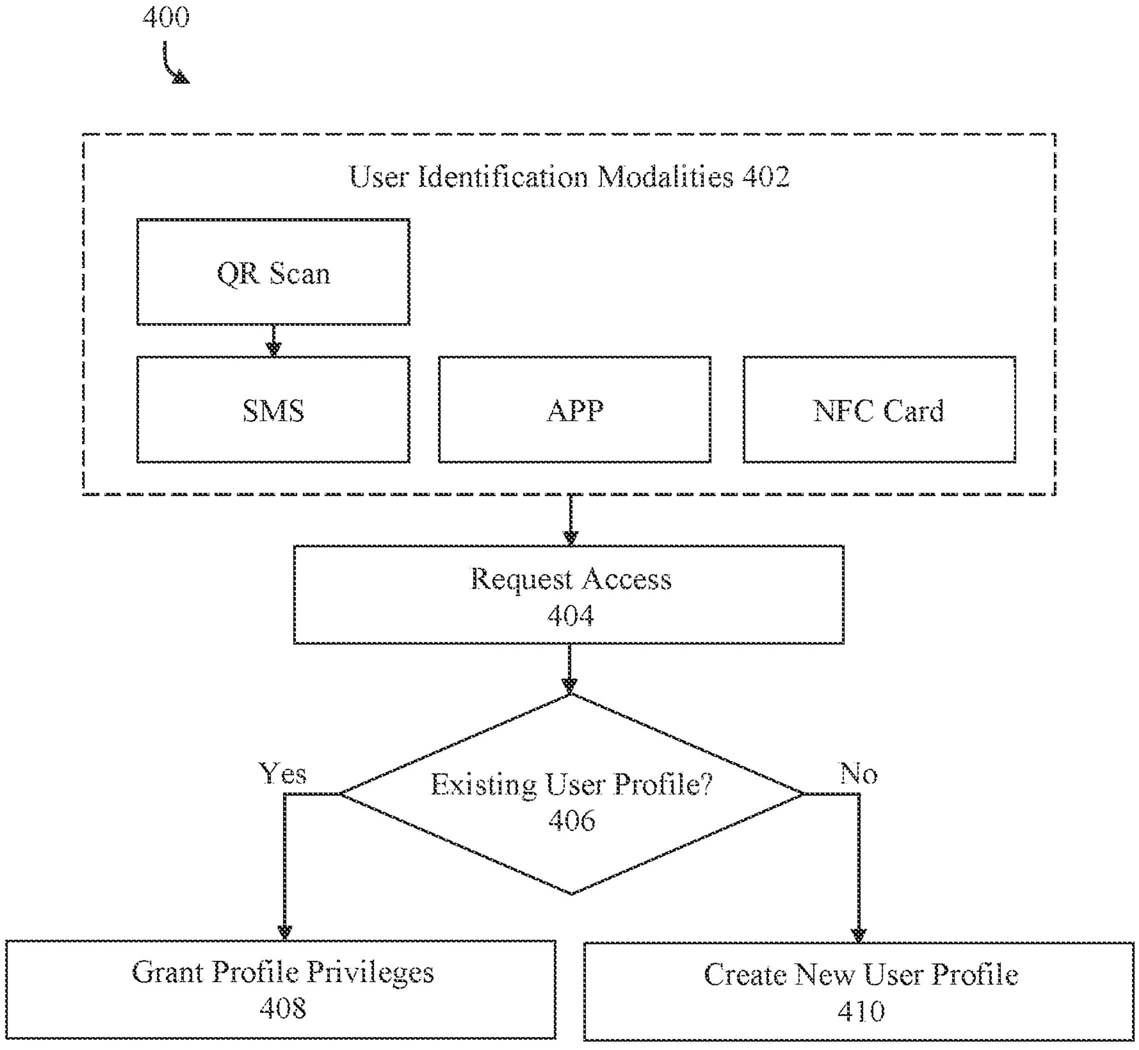
FIG. 4 is a flowchart of a method for verifying or creating a user profile according to an embodiment.

User account or user profile creation or verification can be accomplished through method 400 as depicted in FIG. 4 according to an embodiment. User account or user profile creation or verification can be initiated via user identification modalities 402, which can include first downloading and then using a mobile application or interface, or through the use of an SMS client, or by using an NFC card to communicate with an NFC reader mounted to the exterior of the amenity, or any other type of user identification modality. In some embodiments, the use of an NFC Card can be replaced by any proximity sensing system, such as Bluetooth, Wi-Fi, electromagnetic sensors, or other imaging related sensors. In some embodiments user identification modalities include voice recognition, retinal scans, facial recognition, or other bio signatures that may be measured at point of service at or near the exterior of the amenity. At 404, a user request, such as a request for access to an amenity, is received. At 406, a user authentication and management module 300, runs a query on storage 314, which can be data source 208 in embodiments, to check if the request is coming from an existing user profile, or not.

User identification can be achieved using client-server implementation. API 310 can be any server or serverless solution and process all users' requests from any type of use input source 302, such as application 304, SMS module 306, NFC module 308, and the like.

At 408 if the user identification does match an existing profile, user authentication and management module 300 authenticates that the user profile is in good standing, the system will grant certain privileges to the user, such as providing the user the ability to access the amenity, rate the amenity, or utilize any features that that category of user profile is allowed to utilize. In some embodiments, user authentication and management module 300 also looks up any other categorical data points about that user profile that would affect access or other types of privileges and provides access or information privileges accordingly.

At 410 if the user identification does not match an existing profile, the System creates a new user profile and stores the new user profile in storage 314, and also grants whatever access privileges may be available to a new user, such as free access privileges to an amenity.

In an embodiment, a user can create a user profile by downloading a mobile application, such as application 304. Application 304 can require a user to create a user profile before interacting with amenities. The user profile can include a phone number or email to verify a user's identity. When a user profile is first created, the user's identity can be verified by sending a text to a provided phone number or email to a provided email address or using voice verification. User provided information can be limited such that it may only be linked to a single user profile at any time. Such verification can reduce the risk of users vandalizing or otherwise abusing access to an amenity that may be more prevalent if the user was anonymous.

In another embodiment, user profile can be created in the backend, through the act of a user sending a SMS to a specific number. In this case, the phone number of the user is used for User Identification, and to check if the phone number is associated with an existing account or not. If not, user authentication and management module 300 will create a new user profile and attach that phone number to that user profile in storage 314.

In embodiments, a user account can be created upon first attempted use of an NFC card with a particular Card Identifier, with the attempted use defined as bringing the NFC card in proximity to a NFC reader attached to any amenity 202 in system 200. If system 200 determines that that NFC card or Card Identifier, is not attributed to a user identification number of an existing user profile, a new user profile is created and stored in storage 314.

User profiles can also be manually created by administrators through admin portal 312. Admin portal 312 can include a system interface accessible to certain administrators.

Accessing an Amenity

Figure 5:
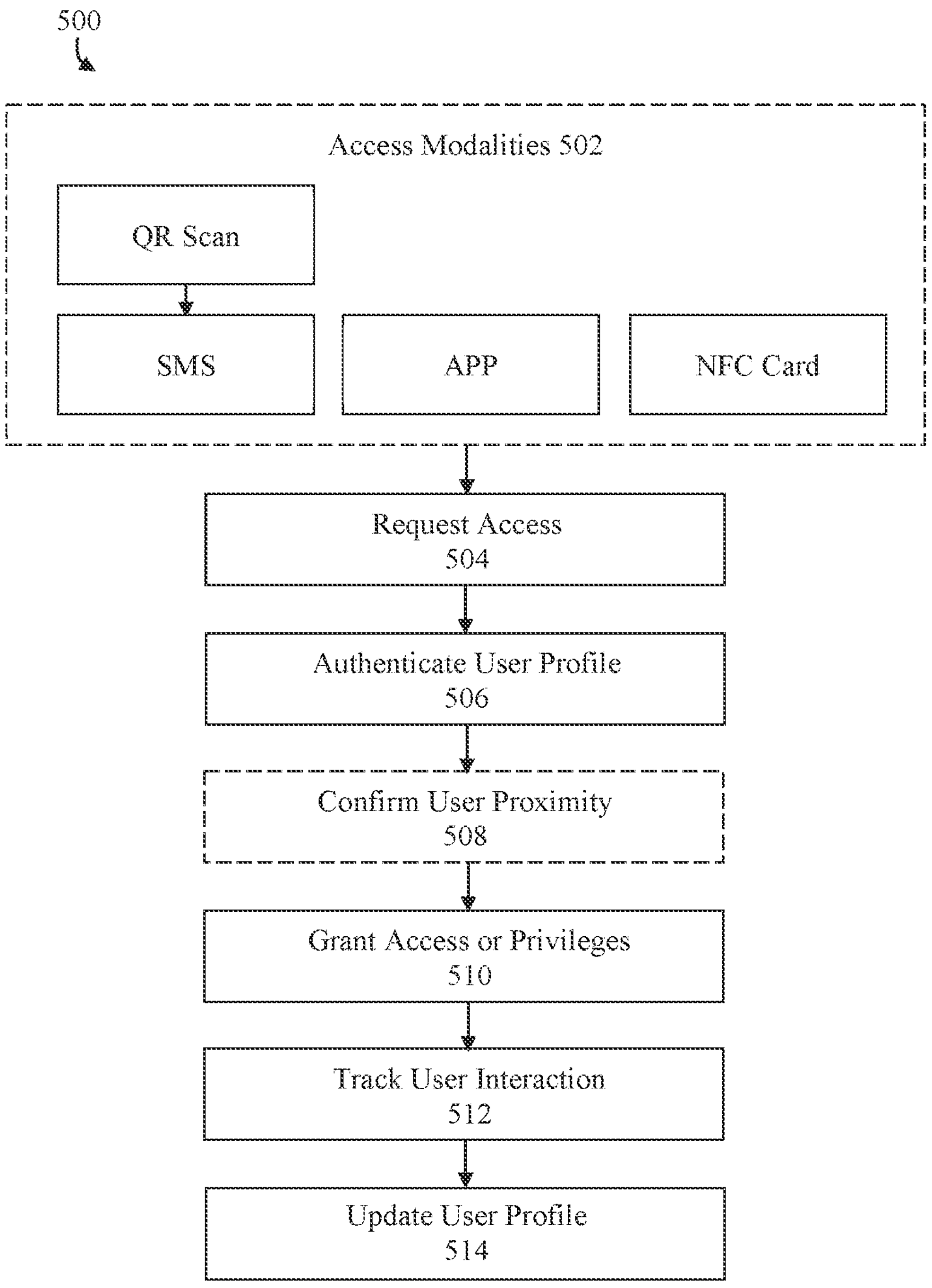
FIG. 5 is a flowchart of a method for granting access to an amenity according to an embodiment.

Referring to FIG. 5, a flowchart of a method 500 for granting access to an amenity is depicted according to an embodiment. At 502 a user attempting to gain access to an amenity will utilize one of any access modalities. In embodiments, access modalities reflect user input sources 302. One embodiment of an access modality involves the user using a user device to scan a QR code, which triggers the automatic generation of an SMS message, pre-populated and directed to an appropriate phone number, and then the user may request access to the amenity by sending the text message generated. Another embodiment of an access modality involves the user manually sending an SMS message from an associated user device to an appropriate phone number, as provided on signage or by other physical or digital displays. Another embodiment of an access modality involves the use of a mobile application with a user interface that provides a button which is configured to send an open request to the amenity to open the door. In another embodiment of an access modality, an NFC card is brought in close contact to an NFC reader on the exterior or near the exterior of an amenity.

At 504 the user requests access to an amenity using the access modality of their choice.

At 506 the user profile is authenticated, such as by method 400.

At 508 the system can optionally confirm the proximity of the user to a particular amenity to avoid non-proximate attempted use cases, spamming of the network, or other security or mis-use scenarios. Proximity can be verified a number of ways and may depend on the access modality being used. For example, if the user is using the application, proximity validation can be accomplished using geolocation of the user device, and comparing that to the distance to the geolocation of the amenity, stored on a digital representation of a map in data source 208. If the distance between the user device and the amenity is below a certain minimum distance threshold, in some embodiments less than 600 feet, the user will be considered sufficiently proximate to the amenity for the access request to be considered valid.

In other embodiments, proximity is confirmed via confirmation from a cell tower based on the location of a text message sent. In other embodiments, a sign on the exterior of the amenity depicts a code, such as "6732" or "apple", and instructions are given so that the user can input that code into their user device, such as an APP or text message module. In other embodiments, proximity is confirmed with use of a dynamic exterior sign, such as an LED sign, e-ink sign, or other type of dynamic display. This sign is configured to change the depiction of the code intermittently, such as every day, every hour, or every new use or use attempt. When a potential user approaches an amenity, that user might be prompted to scan a QR code. Upon scanning the code, they are prompted to send a specific text message to a specific number. The SMS module may ask what the current code is on the sign exterior to the amenity. Upon entering that code, the System can confirm proximity, and progress with access to the amenity, such as opening the door, or providing a button that would be used to open the door. In some embodiments, the QR code itself changes intermittently on the digital sign, such that the scanning of a unique QR code by itself, without sending a supplementary communication, is able to confirm with high certainty of the user's proximity to the digital sign displaying the QR code. In some embodiments, the simple action of the NFC tap, acts to request access, authenticate a user, and confirm proximity simultaneously. In many embodiments these described steps may be performed or accomplished simultaneously via a single action.

In some embodiments, the system 200 performs proximity confirmation before user authentication, or at the same time as user authentication.

Once an amenity has been requested, a user has been authenticated and in some embodiments, where required, proximity has been confirmed, at 510 a user is provided with various access privileges, including but not limited to getting access to, entering, using, exiting, and rating an amenity. In embodiments the user is granted access to the amenity via an open-door button on the application.

At 512 user interactions with an accessed amenity are tracked or monitored. Once a user profile is created in the backend, all interactions with amenities 202, that are attributable to a user profile, such as usage start time, usage end time, usage duration, usage location, entry modality, and all interactions with user devices 206, such as leaving reviews, searching for amenities, location from which an amenity search was initiated, and other data available from the APP, can be associated with the same 'user profile' entity, regardless of the user device at any particular time, and can be used to update certain aspects of that user profile over time.

At 514 each use and service visit of an amenity with the system is attached via data to a user profile of some form. User profiles can be updated or broadened through use of user inputs into the application 304 that can include a user interface that is configured to receive user input through touch input, one or more user interface buttons, voice commands, or other known means of receiving user input. Accordingly, the application 304 can collect information about a user that can be used to construct a user profile. In embodiments, a user profile can include user-specific data such as a username and password, IP addresses of user devices known to belong to the user, contact information (e.g., a phone number or an email), social network accounting linking or identifiers, name and payment information. In embodiments, while the term "application" is used herein, it should be understood that application can refer to any implementation of software that could provide the same or similar functionality, such as a web application, a standalone smartphone application, a website, SMS messaging module, internet message module (i.e. What's App), an API, or the like.

The application 304 or other user devices can receive location data to provide users with status information of nearby amenities. Location data can be acquired automatically by user device 206 or manually entered by a user. In embodiments, the application can be customizable based on user preferences such that amenities displayed or recommended to a user can be based on one or more of distance to amenity, cleanliness of amenity, estimated wait time for amenity, type of amenity (e.g., bathroom, vending machine), accessibility of amenity (e.g., handicap accessible), cost of amenity, and any other amenity features. Furthermore, the user experience flow can be dictated by user location. For example, a user might be presented directly with an "open door" button if an application is opened up while in proximity to a specific amenity. In embodiments, in response to the act of sending a text message to a specific number and confirming or providing geolocation information, a link to the location of the nearest available amenity may be provided via SMS or similar messaging systems.

In addition to receiving user information, the application or user device can be configured to provide alerts, such as push notifications, text messages, or other notifications when certain amenity conditions have been met, such as a nearby amenity becoming available or recently being cleaned. Proactive alerts (alerts that do not rely on user interaction with the application) can prompt users to interact with nearby amenities, particularly nearby amenities that have recently been maintained such that the user can be more likely to have a positive experience with the amenity system.

The application can require a user create a user profile before interacting with amenities. The user profile can include a phone number or email to verify a user's identity. When a user profile is first created, the user's identity can be verified by sending a text to a provided phone number or email to a provided email address. User provided information can be limited such that it may only be linked to a single user profile at any time. Such verification can reduce the risk of users vandalizing or otherwise abusing access to an amenity that may be more prevalent if the user was anonymous.

In embodiments, user profiles may be required to enter payment information (e.g., credit card information, bank account information) before accessing an amenity. The payment information may be verified by submitting a minimal charge and then refunding the charged amount. Thus, a user profile can be associated with verified payment information even if no payment is required to use the amenity.

Robust user profiles, those with substantial or high-quality amenity use history, or that have provided detailed user information, or that are associated with payment for premium services, can receive perks when interacting with amenities. An example of high-quality amenity use history is a high cleanliness rating associated with a particular user profile. This rating may be based on data associated with previous interactions with amenities on the amenity network, including subsequent usage cleaning scores provided by other users following the user profile's uses, which may be compared to cleaning ratings prior to or during the use of the particular user profile in question. User profiles associated with higher or similar cleaning ratings by users after their use compared to ratings from before their use will have higher cleanliness scores. User profiles associated with lower cleaning ratings by other users after their use compared to ratings from before their use will have lower cleanliness scores. User profile scores and ratings may also be associated with the presence or absence of vandalism events, extended use events, or other negative events processed by the amenity network.

User profiles with good ratings may receive extra or beneficial treatment. For example, a user profile associated with no negative events after a predetermined number of uses can be granted additional time in the amenity or access to additional amenity features. For example, access to a supply cabinet containing items for sale or for free can be limited to user profiles with at least five amenity visits without incident. Inventory tracking within the supply cabinet can monitor consumption/removal of certain items and attribute the removal with the user profile accessing the amenity.

Incidents, such as vandalization of the amenity or a user repeatedly leaving a unit in a more disordered or dirty state than it was upon entry, can be associated with user profiles. In embodiments, if a user profile is associated with an incident, restrictions can be placed on the user profile, such as temporarily or permanently being denied access. In embodiments admin portal 312 can be used to control or manipulate user access and user privileges. If a user is determined to have vandalized or broken an element of the amenity, the user can be charged a fee and prevented from accessing the amenity until the fee is paid.

In some embodiments, a numerical Profile Quality Score is attributed to a given user profile, which is updated over time as the user interacts, or doesn't interact with system 200. In some embodiments, this score is accessible and knowable to the user. In some embodiments, this score is hidden from the user and is only used in the backend. This Profile Quality Score may be comprised of many subcomponents or categories, each with different weightings or coefficients, and those weightings may change over time. Certain categories may decrease the Profile Quality Score and certain categories may increase the score. In embodiments, one category is the frequency that a user provides a user rating. In embodiments, a category is, for each use of an amenity attributable to a user profile, the average cleanliness score provided by the next user who rates that same amenity. In embodiments, a category is, for each use of an amenity attributable to a user profile, the difference between the average cleanliness score provided by the last user who rated that same amenity and the average cleanliness score provided by the next user who rated that same amenity. In embodiments, cleanliness proxies may utilize more complicated statistics than simple averages, including utilization of more than one score, and filtering processes to throw out aberrant data. In some embodiments, categories can include frequency of use, water utilization, duration of use, average duration of use, number of different amenities used, cleaning services provided, presence of major events, complaints attributable to that user, or other negative customer issues such as lack of payment or indecent behavior. In some embodiments, the Profile Quality Score may be altered by payments from the user.

In embodiments, the Profile Quality Score may be utilized as part of the authenticate user process, and in embodiments the Profile Quality Score may be utilized as part of the grant privileges process. In some embodiments, if the Profile Quality Score is below a certain lower threshold, when a request is made to gain access to an amenity, the system will deny access, and in some embodiments the system will communicate to the user about the reason for the denied permissions, via a user device or other means. In some embodiments, a user may request access to a locked compartment within an amenity, such as an Amenities Box that holds consumables. If the Profile Quality Score is above a certain threshold, access, free or paid, may be granted to that user, or if the score is low, access may not be granted. Other digital features within the application may also be restricted to users with a minimum Profile Quality Score, such as the ability to search non-proximate amenities on a digital map, to see information about amenities, or to input information about certain amenities or lack of amenities.

In embodiments, the application can be used to perform other functions from within an amenity. These functions can be tied to the user profile that was granted access to the amenity. In the context of the amenity being a bathroom application, functionality can include one or more of opening a supply cabinet that includes toiletries, consumables, feminine products, sexual health products, water, phone chargers, or other goods, turning on a sink, opening the door to exit, calling for help, extending allotted duration of usage, playing games, dispensing soap, flushing a urinal or toilet, opening a cleaning cabinet, rating cleanliness of the bathroom, turning lights on or off, changing the brightness of lights, turning music on or off, changing the volume of music, changing ventilation or HVAC settings, changing the content of a user interface in the amenity. In embodiments, this application functionality can only be controlled on the user device that was used to enter a specific amenity, and only while the user device is detected to be within the amenity during a usage session.

Figure 6:
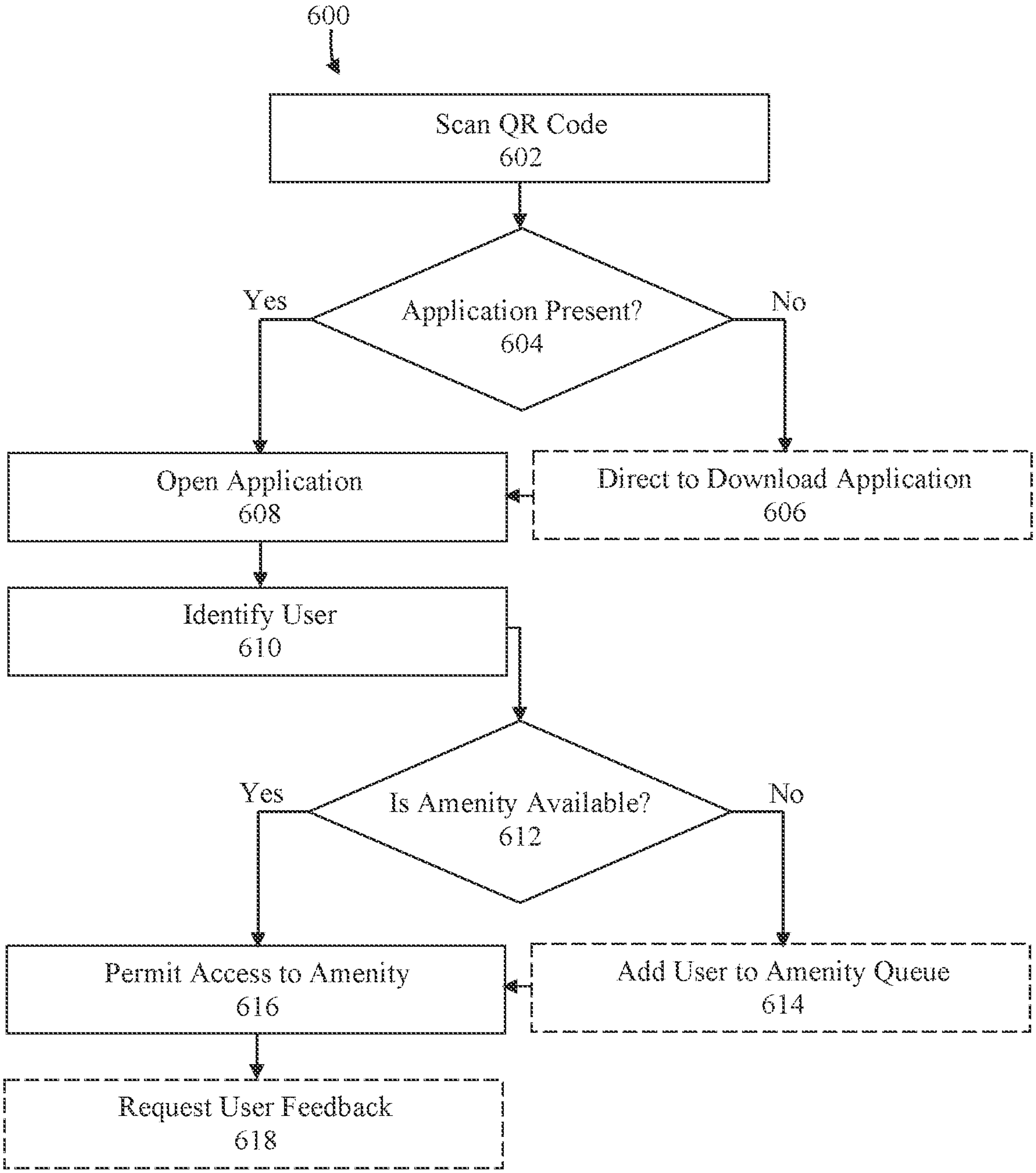
FIG. 6 is a flowchart of a method for accessing an amenity according to an embodiment.

Referring to FIG. 6, a flowchart of a method 600 for accessing amenities is depicted according to an embodiment. Method 600 can be implemented on a user device, such as user device 206.

At 602, a user can scan a QR code or other indicia located on or proximate to an amenity that the user wishes to access.

At 604, a link associated with the QR code checks whether the application is present (has been downloaded) on the user device. If no application is detected on the user device, at 606 the user can optionally be directed to download the application. In alternative embodiments, a webpage or web application can be opened at 606. If the application is detected, the application is opened at 608. In further embodiments, accessed can be gained via a text message send to the user device in response to scanning the code. In further embodiments, accessed can be gained via a text message send from the user device to a specific number, after scanning the code.

At 610, the user is identified such as through a login process to identify a user profile. In some embodiments, simply opening an application also serves the step of Identify User 610.

At 612, the occupation status of the amenity is checked using one or more sensing modules incorporated in the amenity. In embodiments, a weight sensor can be used to detect a user's presence inside the amenity.

At 614, if the amenity is occupied, the user is added to a queue. In embodiments, the application can inform the user of their position in the queue and an estimated wait time. The estimated wait time can be based on an average user duration and the number of users ahead in the queue. In embodiments, an alert can be sent to the user when they are permitted to access the amenity. When a user is notified, access to the amenity can be permitted for a predefined window of time, such as 30 seconds, after which time the user loses their position in the queue.

In embodiments at 614, the user is added to a virtual queue room, which comprises a digital representation of one or a group of user profiles that have been authenticated to use the amenity. This virtual queue room does not maintain a fixed order, but instead anyone who is currently within the virtual queue room who attempts to enter the amenity, for example by pushing an open door button in an application or sending a specific SMS message to a specific number, then access is granted, regardless of the order in which that person was added to the virtual queue room.

At 616, the user is permitted to access the amenity. In embodiments, access can be permitted by automatically opening the door at this point in the flow. In embodiments, access is permitted when the user is detected at the door. The user can be detected using one or more sensing modules. In embodiments, the user can present the application to a scanner incorporated in the amenity or by entering a provided code into a user interface of the amenity. In embodiments the door closes after the previous user exits, and then reopens when a user initiates access via any user device. In embodiments, the door closes after the previous user exits and then automatically reopens after a specified amount of time. In embodiments, the door never closes between users, but a digital sign or a display message on a user device is used to alert the user when access is permitted.

At 618, a request is sent to the application requesting user feedback about their amenity experience. In embodiments, the request can be sent to the user's application as an alert with a prompt to select one of several graphics representing their satisfaction and/or cleanliness of the amenity. In embodiments, the request can include an option to submit a maintenance ticket. Where the amenity incorporates a user interface, the request can be presented prior to the user leaving the amenity. In embodiments, the request is sent via SMS at some subsequent time after access is permitted.

Use of amenity searches in the application, intent to use signals based on QR codes and location, and/or actual amenity utilization such as that represented by FIG. 6 can be used to generate a bathroom demand map to inform future placement of amenities or servicing requirements for existing amenities.

Embodiments of userbase accountability systems and methods considered in the present disclosure can be implemented without reliance on an application. Where a user device, a network connection, or an application may not be available or is simply undesired, physical cards each associated with a unique user ID can be distributed to individuals as a way to provide access control to amenities. Systems including such access cards can incorporate near field communication (NFC), RFID tags, a QR reader, Bluetooth connectivity, and the like.

Figure 7:
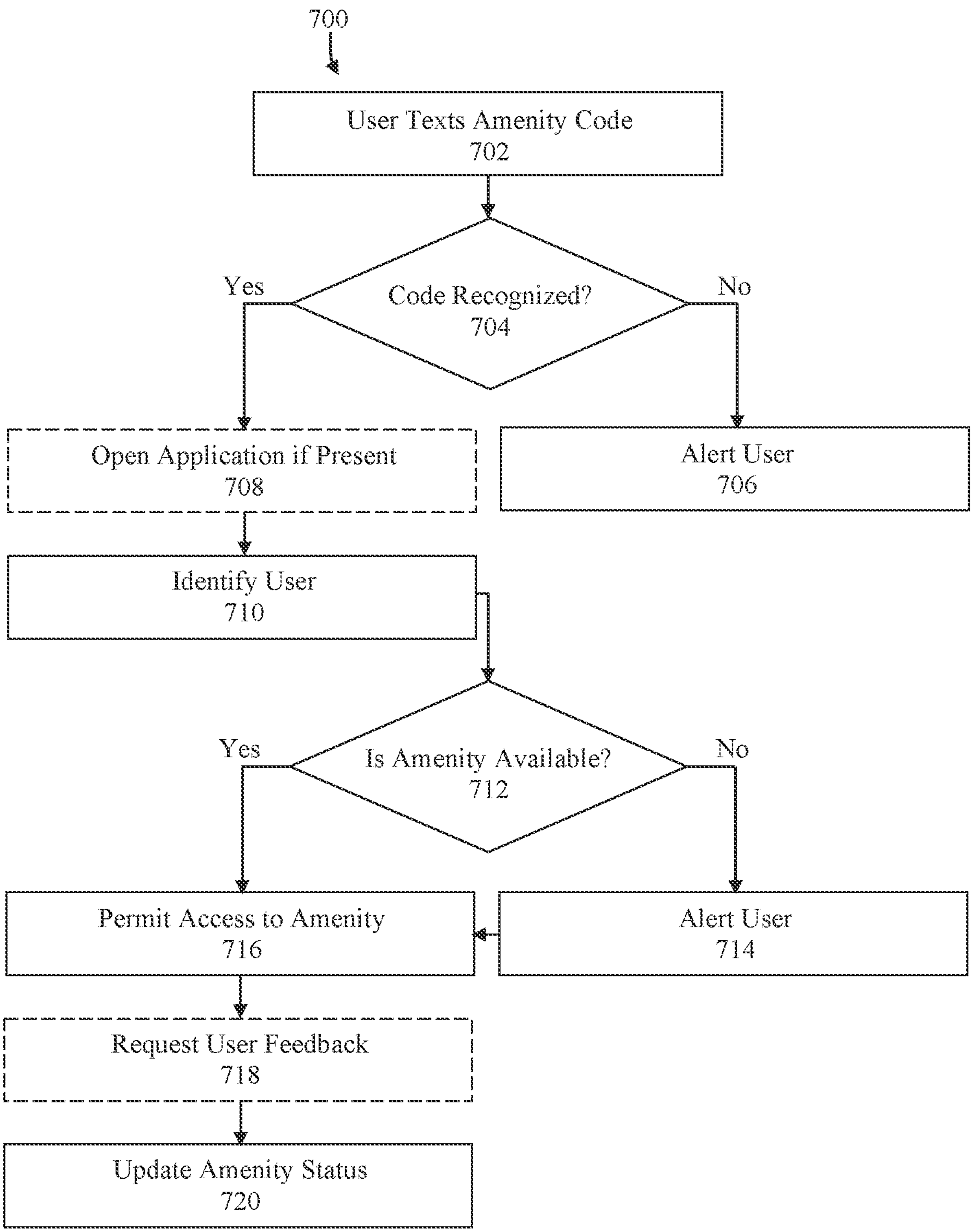
FIG. 7 is a flowchart of a method for accessing an amenity according to an embodiment.

In embodiments where the user has a user device but does not want to or cannot download an application, communicating unique codes associated with each amenity can be used as by a method 700 in FIG. 7.

At 702, a user can text an amenity specific code to a provided number or otherwise enter the amenity code into a website or user interface. The amenity specific code can be provided on or proximate to the amenity such that the user's presence at the amenity location can be assumed.

At 704 the amenity specific code is compared to known codes, such as codes stored in a data store. If the amenity specific code is unrecognized, the user can be notified via a text message or prompt indicating so at 706. Optionally, at 708 if the code is recognized, the application can be opened automatically if detected on the user device used to submit the code.

At 710, the identity of the user is determined such as by detection of a user profile associated with the application, use of a known or registered phone number to submit the code, or presentation of a physical card associated with the user.

At 712, the occupation and maintenance status of the amenity is reviewed to determine if the amenity is available. In embodiments, availability of the amenity can be reviewed based on data collected from one or more sensing modules associated with the amenity. At 714, if the amenity is occupied or otherwise unavailable the user can be alerted. At 716, once the amenity becomes available the user is permitted to access the amenity.

Optionally at 718, user feedback can be requested. User feedback can include a review of the amenity cleanliness, maintenance, and overall experience.

At 720, amenity status can be updated to reflect whether the amenity is available and to account for any user feedback received. When user feedback is not received, cleanliness and maintenance of the amenity can be automatically updated based on typical usage of the amenity. For example, the cleanliness rating can be estimated based on the number of uses since the last cleaning. In such embodiments, after a certain number of uses is reached the amenity can be removed from operation or flagged as potentially in need of servicing.

In embodiments, QR codes associated with an amenity can be scanned by a user device to provide an auto-populating text message to quickly confirm or establish a user identity without use of an amenity specific code. Such embodiments can provide entry to the amenity with minimal time and complexity. In embodiments, a QR code can be scanned which automatically generates a specific message within the SMS messaging module on a user device, and that message is also automatically populated with a specific recipient phone number, and the sending of that specific message acts as a code, and can be used to confirm the user's intent to use the amenity and in some cases the user's proximity to the amenity.

Figure 8:
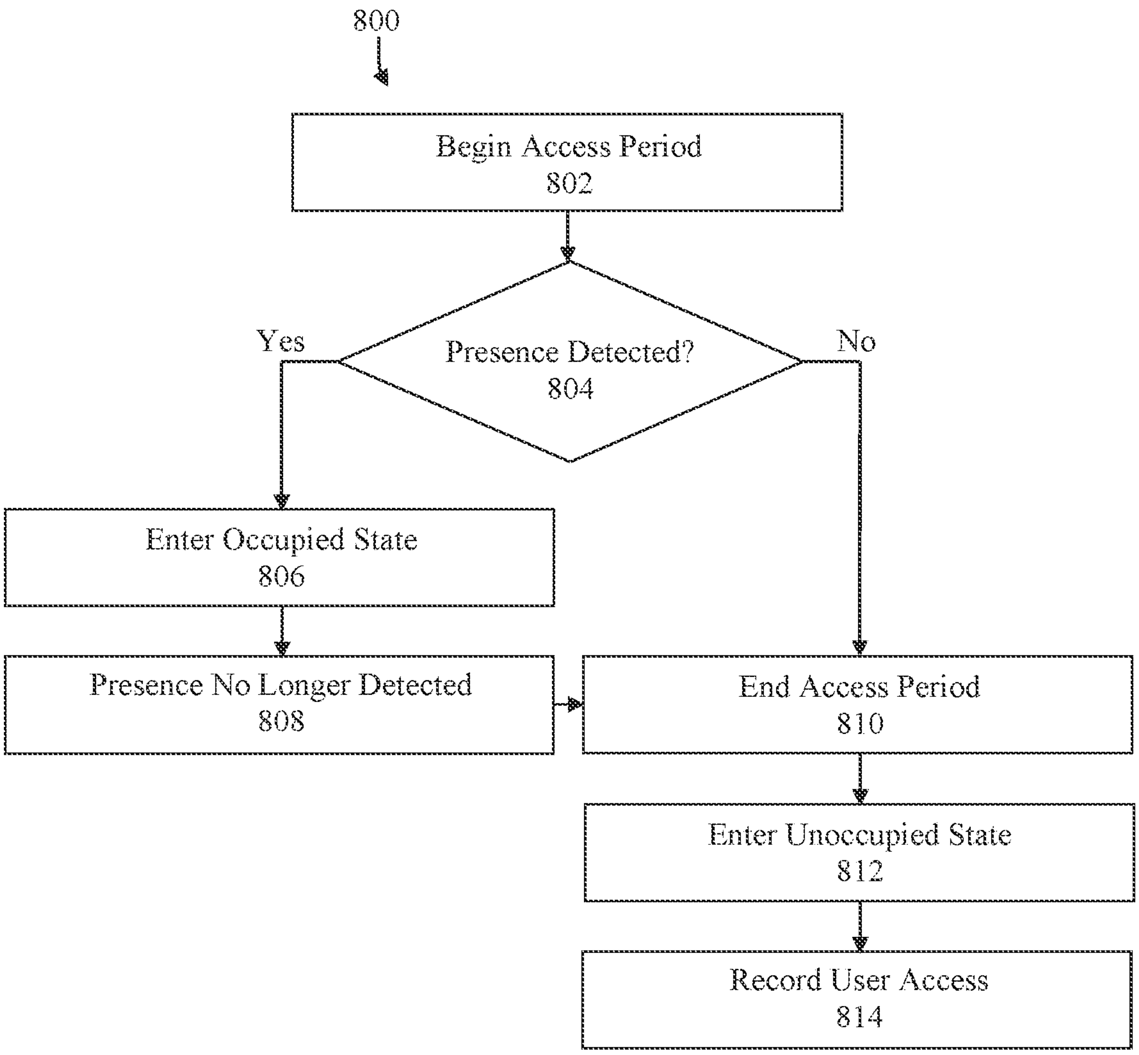
FIG. 8 is a flowchart of a method for controlling access to an amenity according to an embodiment.

Referring now to FIG. 8, a flowchart of a method 800 for granting a user access to an amenity is depicted according to an embodiment. Method 800 can be used when a user is permitted access to the amenity such as after or during 616 of method 600 or 716 of method 700.

At 802, a user is permitted access to the amenity and a corresponding access period begins. In embodiments, the beginning of the access period can provide an alert to a user and/or automatically open the amenity door when the user's presence is detected proximate to the entrance of the amenity or anywhere inside the amenity at 804. The user's presence can be detected using one or more sensing modules associated with the amenity including light based sensors, weight based sensors, sound based sensors, or a combination of these with an algorithm to determine occupancy. In certain embodiments, the algorithm is configured to confirm occupancy as quickly as possible while minimizing the number of false positives, utilizing a combination of a high frequency and low frequency threshold system.

At 806, the amenity enters an occupied state if the user is detected to have entered the amenity. The occupied state can result in the door automatically closing behind the user. Once the user's presence is no longer detected at 808 the access period is ended at 810. In some embodiments, there is a requirement that the system also detect that the door has been opened between 806 and 808, or between 808 and 810.

At 812, the amenity status can be updated to reflect that it is unoccupied and otherwise available to begin a new access period.

At 814, the user access is recorded. In embodiments each user access is assigned a specific and unique use ID. In embodiments, recording user access can include updating an amenity log, a user profile, or the like with timestamps of access, including timestamps for each step in the flow chart shown to the particular amenity. As described in other sections, any other data collected during the usage can also be logged in the database for that user and for that amenity. In embodiments where user feedback is received, this feedback can be stored in conjunction with the user access and with the use ID.

Real Time Status Tracking

A real-time status tracking module, configured to track the cleanliness and/or functionality or other status of each amenity on the network over time (after each use for example) can be implemented across amenities, such as a series of bathrooms 100. Cleanliness and maintenance status can be determined using one or more of real time user feedback and in unit sensing modules (e.g., methane sensors, external camera with in between use internal image capabilities, etc.). In embodiments, cleanliness tracking can also be supplemented with scoring provided by service workers such as cleaners, pumpers or technicians, who can rate the cleanliness qualitatively or quantitatively at the time of service, which can also have bearing on the cleanliness at or after previous uses. In embodiments in which an external camera is used, a machine learning (ML) training system is implemented with data from previous images of the inside of bathroom amenities, which have each been correlated to cleanliness scores provided by users or by service workers rating the cleanliness of the amenity in the image (either based on the image itself or based on in person ratings of the amenity around the same time). The ML algorithm is trained to provide a cleanliness score for a bathroom based on any number of variables within the image to match to a best approximation what an image of an amenity to the rating a human would give to that same amenity interior at that time.

Cleanliness and maintenance data can be used to generate a cleanliness score to improve efficiency of cleaning and maintenance operations. The cleanliness score can be derived from one or more of user feedback from users upon entering, or following use of the amenity, smell sensor data (e.g., methane sensor or other volatile organic compound sensors), and imaging data (i.e., external camera paired with a remote door open to look inside amenity in between uses). The cleanliness score of amenities can be used in operations to toggle to enter an "offline mode" based on cleanliness scores. In embodiments, offline mode can be toggled manually or automatically if the cleanliness score is below a threshold. In offline mode, the amenity can be blacklisted or not appear for users trying to locate a nearby amenity until a service is able to be performed on the amenity. In embodiments, the amenities can be automatically placed in offline mode during scheduled cleaning or maintenance.

Verification of cleanliness scores can be required prior to taking action on an amenity, according to embodiments. Verification can be based on one or more of more than one very low cleanliness score or review from users, a very low review from a user with history of accurate reviews, a very low review from a user that is supplemented with a minimum amount of additional information about the state of the amenity including extra answers to multiple choice follow up questions, direct text inputs, or pictures submitted with feedback, and data collected from smell or visual sensors.

Ranked cleanliness scoring can be used in combination with geographical location, predicted utilization, and other factors (such as paying customer vs free customer) to determine the most effective cleaning prioritization within a bathroom network.

Figure 9:
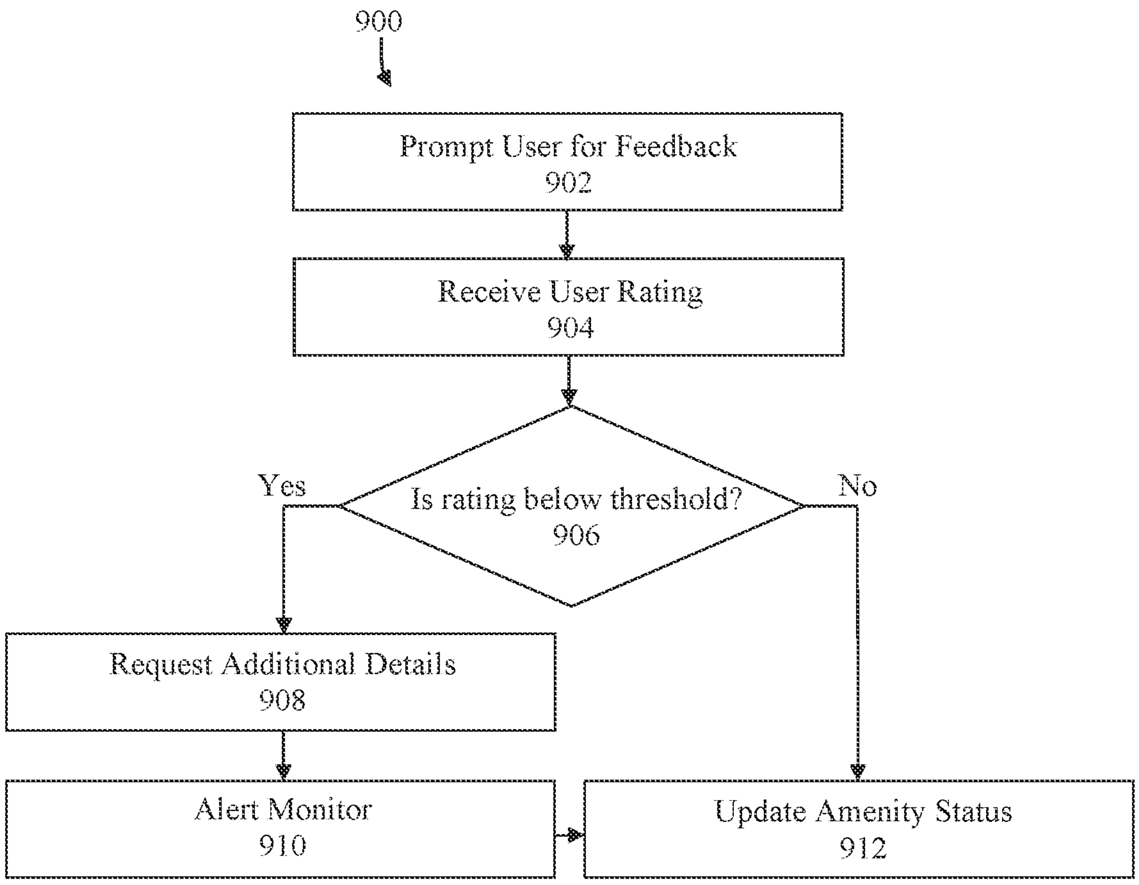
FIG. 9 is a flowchart of a method for receiving user feedback according to an embodiment.

Referring to FIG. 9, a flowchart of a method 900 for receiving user feedback is depicted according to an embodiment. Method 900 can be used to request user feedback such as during 618 of method 600 or 718 of method 700.

At 902, a prompt is presented to a user requesting feedback. In embodiments, user feedback can be requested through a user interface associated with the amenity or through an application associated with the amenity. The feedback prompt can include a series of emoticons representing the user's satisfaction with the amenity for the user to select according to an embodiment.

In embodiments, the feedback prompt can include an indication of an award to be granted if the user provides feedback on the amenity. In embodiments, the award can be one or more of a discount or coupon for a service or product, improved status of a user profile associated with the user, a monetary award, or the like. The award can be based on the extent of feedback provided and can be cumulative across amenity uses.

At 904 a user rating is received to represent one or more of a cleanliness score, a maintenance score, or overall satisfaction.

At 906, the user rating is compared to a threshold. If the rating is below the threshold, at 908 additional details can be requested from the user and at 910 a monitor of the amenity can be alerted to the user rating. If the rating is above the threshold or after the review process is complete, at 912 the amenity status can be updated to reflect the user rating.

One aspect of such a user feedback module is to improve responsiveness to amenities that require cleaning while reducing the number of unnecessary servicing visits. To improve the estimation of amenity cleanliness, user feedback can be weighted considering a user's feedback history. In embodiments, the historical average amenity rating for each user can be considered. For example, if a particular user has a history of providing low satisfaction ratings for an amenity that other users consistently rated higher and was found to be satisfactory based on amenity standards, the particular user's subsequent ratings can be weighted accordingly. In this manner, the threshold rating for which service is requested can be personalized to each user.

Another aspect of the user feedback module is to increase the weight of feedback from users who have a history of accurate feedback. In such circumstances, the more feedback a user provides the more the resulting cleanliness score can be impacted. Similarly, if a first-time user provides feedback, that feedback can have less of an impact on the amenity's cleanliness score. In embodiments, the weight of a particular feedback may also be increased if that feedback contains multiple inputs, such as answering follow up multiple choice questions, regardless of the rating history of that user.

A further aspect of the user feedback module is to update the access status of particular users based on one or more of cleanliness tracking data, user authentication data, service worker reports and checklists filled out at service visits, and sensor data from accessed amenities. The cleanliness scores provided prior and subsequent to a user's access can be used to determine a user's typical effect on the amenities used. If amenity cleanliness scores are found to regularly decline after a particular user accesses each amenity, that user's access to amenities can be reduced or altogether revoked. In some circumstances, if a user's access precedes vandalism, damage, or otherwise results in the amenity being inoperable or unclean, the user's access to amenities can be reduced or revoked following a single incident. Alternatively, if a user demonstrates a history of using the amenities without significantly impacting the cleanliness score, the user can be provided with increased access status to features of the amenities or exclusive amenities. In embodiments, data from sensor modules associated with accessed amenities can also be used to verify a user's effect on an amenity, including for example, occupancy sensors used to determine typical or average usage duration for a particular user.

Accordingly, embodiments of the present disclosure provide for a user authentication module, a real-time status tracking module for the cleanliness and functionality of each amenity within a network over time, and a user base management module that updates the access status of individual users based on use. Collectively, these modules can reduce overhead for the operation of amenities and improve users' experiences when accessing amenities. Additionally, user accountability can encourage positive user interactions with amenities and discourage negative user behavior such as vandalism. While described as individual modules, functionality of the user authentication module, the real-time status tracking module, and the user base management module can be consolidated or expanded across one or more modules. Whereas conventional amenities require an in person visit to solve many issues that can occur, modules as described herein can provide for more efficient operations through the use of improved estimation of amenity status and user accountability.

Monitoring and Operations

Figure 10:
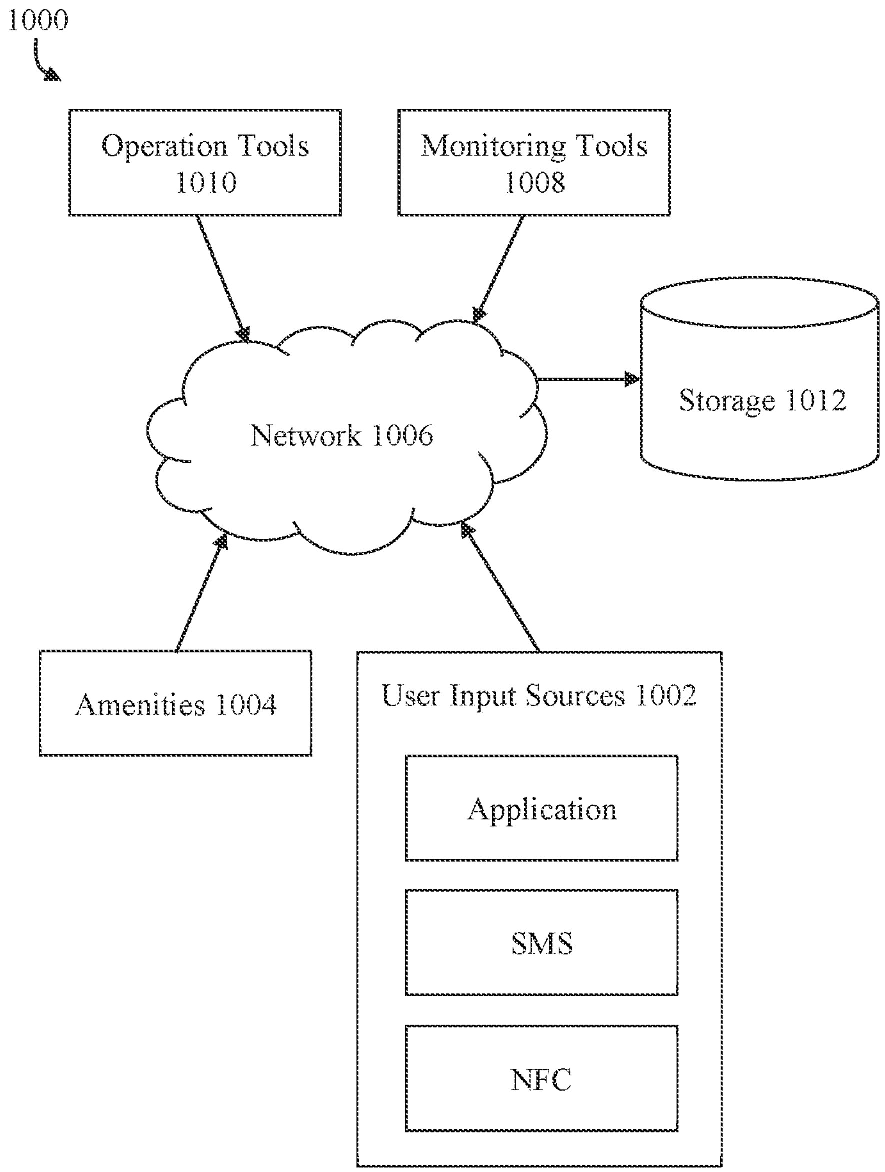
FIG. 10 is a block diagram of a monitoring and operations module for managing publicly accessible amenities, according to an embodiment.

Referring to FIG. 10, a block diagram of a monitoring and operations module 1000 is depicted according to an embodiment. Monitoring and operations module 1000 is configured to collect, real-time and non-real-time (historic data) information about events, processes, service and cleaning visits, state changes in amenities and processing this data for improving operation processes, reduce manual actions for functioning amenities, such as through a remote reset reboot, prioritize and optimize operations requests depending on location, urgency, or other factors, and manage technicians, cleaners, and any other operation teams. In embodiments, monitoring and operations module 1000 can be implemented as part of monitoring and analytics tools 218.

Monitoring and operations module 1000 can incorporate or otherwise use all elements of system 200 (e.g., network 204, operation application 216, data source 208), and includes user input sources 1002, amenities 1004, network 1006, monitoring tools 1008, operation tools 1010, and storage 1012.

User input sources 1002 can include one or more of an application, an SMS module, an NFC card 308, other physical card, other devices or scannable images, such as a QR code, and other ways of accepting user input to access amenities 1004.

Amenities 1004 sends data about amenity status, sensors, and any hardware or firmware modules to network 1006 that is stored in storage 1012. In embodiments, storage 1012 can be any type of relational or non-relational database or any combination of a known types of databases. Data sent by amenities 1004 can be used to improve operations processes and the stability of amenities 1004. User data (e.g., usages, reviews, cleanliness ratings) and user actions, such as those collected from user input sources 1002 can similarly be processed by network 1006 and then stored in storage 1012 to improve the user experience and improve operations processes.

Monitoring tools 1008 can include one or more modules for monitoring the state of amenities 1004 and/or any user-generated data. In embodiments, these modules are configured to provide data visualization (dashboards, graphs, charts) for measuring and monitoring system performance, health, and availability. In embodiments monitoring tools 1008 include alerting solutions to increase awareness about possible issues, failures, and outages. These alerts can be provided to an administrator of system 200 through an administration portal.

In embodiments, operational tools 1010 include one or more modules configured to improve operational processes and decrease operations costs by automating manual tasks. Operational tools 1010 include programmed scripts, scheduled tasks, servers or serverless solutions, solutions for remote fixing and debugging amenities 1004, and machine learning solutions for predicting usages, power consumption, cleaning needs, and the like.

Figure 11A:
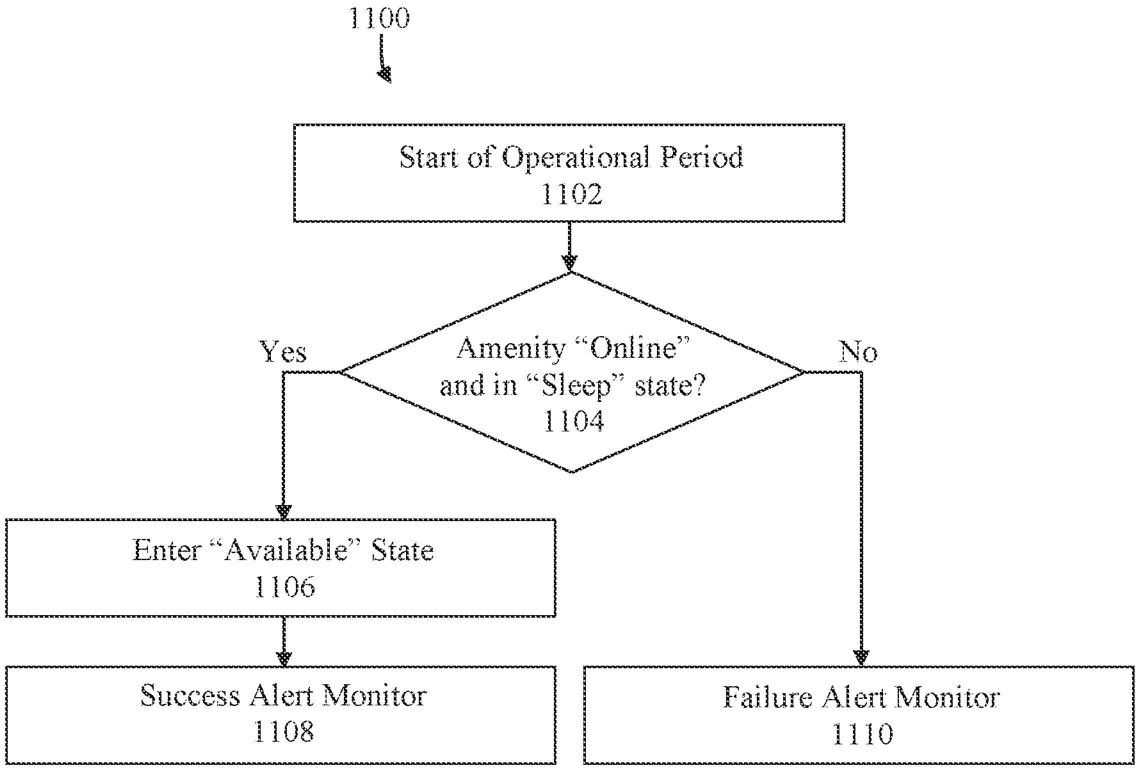
FIGS. 11A and 11B are flowcharts of a method for automated scheduling according to an embodiment.
Figure 11B:
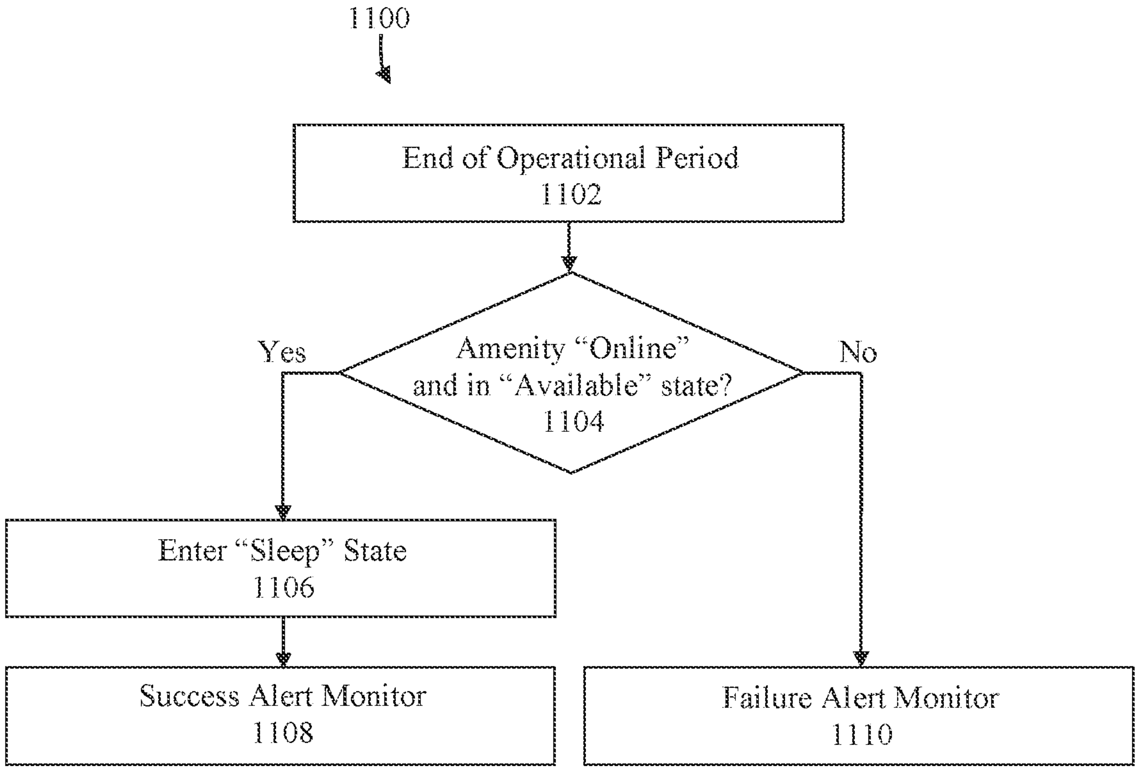

One such an automated solution enabled by operations tools 1010 is depicted in FIGS. 11A-11B that illustrate schedule automation of working hours for amenities.

FIG. 11A depicts the start of an operational period according to an embodiment. At 1102, the operational period is started, such as at a predetermined time or when a first use is requested by a user. At 1104 the amenity status and use state are determined. If the amenity is online and in a sleep state, at 1106 the amenity enters an available state indicating the amenity can be accessed by users. The availability of the amenity can be indicated to an administrator by providing a success alert at 1108. If the amenity is not online or not in a sleep state such that the operational period has already begun or the amenity is otherwise unavailable, a failure alert can be provided at 1110.

FIG. 11B depicts the end of an operational period according to an embodiment. At 1102, the operational period is ended, such as at a predetermined time or when a use has not been requested by a user for a period of time. At 1104 the amenity status and use state are determined. If the amenity is online and in an available state, at 1106 the amenity enters a sleep state indicating the amenity can temporarily not be accessed by users. The end of the operational period of the amenity can be indicated to an administrator by providing a success alert at 1108. If the amenity is not online or not in an available state such that the operational period has either already ended or the amenity is unavailable, a failure alert can be provided at 1110.

In embodiments, the automated scheduling enabled by operational tools 1010 can improve energy efficiency, security of the amenity, and monitoring of amenities across an amenity network. Machine learning can be employed to develop amenity-specific schedules based on use. For example, if a particular amenity experiences a reduced frequency of use on Sunday mornings, operational tools 1010 can automatically place the amenity in a sleep state for those hours without adjusting the schedule of other amenities that may experience normal use frequency during that timeframe.

In embodiments, operational tools 1010 can be any kind of web or mobile application with a user interface to provide a way for operation persons (e.g., cleaners, technicians) to operate amenities 1004 (e.g., enter, debug, submit reports).

In some embodiments operational tools 1010 can be publicly available and provide a way for users, contractors, employees or gig workers to sign up for doing operational activities, such as cleaning. In such embodiments, operational tools 1010 can be accessed in a manner independent from the normal use application 304. For example, a mobile application, such as a cleaners application can provide the option for a person to sign up, create a cleaner profile, become authenticated, and choose one or a few amenities that should be cleaned, and display a reward for the job. If a user selects a particular operations job, the right to clean particular amenities can be reserved for the user profile for a predetermined period. During this period, the user can be given access to the amenities and optionally cleaning supplies within the amenity. In embodiments, cleaning or other maintenance supplies can be selectively provided via operation of a smart lock on an internal cleaning or supply cabinet. In embodiments, the user can be provided with one or more of heightened privileges, instructions, a digital checklist, the ability to take and upload pictures of the amenity before and after cleaning, answer questions about the state of the amenity, provide a cleanliness score for the amenity upon entry, resolve issues flagged in the backend ticketing system, and receive payment for the services. Payment can be provided to a user through a banking interface within the cleaning application or separately. In some embodiments, users can be compensated in the form of free or discounted services within the amenity system that can be redeemed immediately or in the future.

In certain embodiments, tools may include similar application system for pumpers, which provides information about prioritization of units to pump waste or fill water, based on real time sensor data on individual units that communicate the volume of waste or fresh water, respectively, in each unit. Prioritization for pumping visits may also take into account the predicted utilization of certain units and predictions about when a unit will be out of fresh water or full of wastewater. Such a Pumping App may provide a pumping service worker with a dynamic route list, access to units, access to pumping inlet/outlet panel, access to checklists, ability to log fluid volumes pumped, and other similar information and input privileges described above. Similar applications may be provided for technicians.

In certain embodiments, the amenity system uses algorithms that can include machine learning for predicting amenities that should be cleaned and providing the best route for a particular service worker to make for cleaning several amenities during the day. In embodiments, such algorithms may also be used to weight payments for or other compensatory benefits for cleaning particular amenities over other amenities.

Embodiments of the present disclosure accordingly provide for efficient tools and operations for cleaning and other services such as wastewater pumping, freshwater filling, supply stocking, technical maintenance, technical operations, moving of amenities, checking of amenities, turning off amenities, placing signage at amenities, or transporting amenities. These monitoring and operation tools leverage real-time and historical data to optimize maintenance of an amenity network.

In particular, the monitoring and operations module can track user profiles and receive user provided data to more efficiently monitor amenity status in real-time and accurately predict demand over time. This user data can optionally provide a more complete user experience by improving queue time estimation and tailoring application interfaces or amenity interaction based on user-specific data. For example, the amenity system can base predicted wait times for an amenity on the average amenity duration of each user profile in the queue. Additionally, each time a user accesses an amenity an entry can be made on the user profile including date and time stamps for the period of attempted access and the amenity details. In embodiments, the entry can be hidden from the user. In other embodiments, a list of one or more previous entries can be presented to the user for reference as to which amenities were visited and how they rated the amenity. Similarly, a log can be compiled per amenity such that use of the amenity can be monitored over time. Use trends for amenities can allow for tailored maintenance and cleaning schedules. In embodiments, use trends across a range of amenities can be used to calculate efficient maintenance and cleaning routes to reduce overhead costs associated with providing the amenities.

In embodiments, cleanliness tracking can be implemented by requesting user feedback during or after user of an amenity and through interpretation of data collected by one or more sensing modules. In embodiments, user feedback on the current state of the amenity can be collected from within the bathroom. The data collected by the user authentication module can be used to update the access status of individual users. Access status can refer to allowing a user to use an amenity, the cost associated with amenity use, and other factors that can influence or control a user's level of access to amenity features.

Advertising and Communications Suite

An embodiment is described in which the System (200) is able to provide digital and physical advertisements or communications to specific users, through various modalities, at specific times or at specific amenities. Modalities of advertisements include still or video adds shown to users on the user device prior to entering the amenity, during use of the amenity, or upon exiting the amenity. In embodiments, the user must watch a video of some length before gaining access to the amenity or select an option to pay for a premium subscription to avoid such advertisements. In embodiments, audio ads may be played over speakers within the amenity during use, and similarly, users may pay for premium subscription to avoid such adds. In embodiments, digital screens may be incorporated into the exterior or interior of amenities. In certain embodiments, the App interface depicts ads for specific fixtures present in the amenity, such as a ToTo toilet, so that users may get deals on or information about certain amenities they find inside a unit. In embodiments, advertisements may be specific to local business or foot traffic needs, such as an ad for a nearby restaurant or retailer, supplied to a user with directions to that location or a time sensitive deal or offer. In embodiments, the ads may be catered to specific attributes known by the userbase management system based on a user's onboarding data, usage history, location of usage, access modality, or other inputs.

Predictive Capabilities

The user data and amenity data collected from embodiments of the present disclosure can be used to predict use across amenity networks. For example, use of a phone number-based account module as described herein, whether through SMS or application registration, allows an amenity network to identify use peaks for particular times. Further, use of amenity searches in an application, intent to use signals based on QR codes and location, and actual amenity utilization can be used to generate an amenity demand map to inform future placement of amenities and/or servicing requirements in the future. Usage data sets categorized based on the amenity locations and identified events can be used to create prediction models of future use periods. For example, amenities located surrounding a stadium can be correlated such that dramatic fluctuations in use during events at the stadium can be predicted and accounted for across the amenity network.

Another prediction capability is the implementation of access control based on predicted or actual demand. For example, surge pricing for amenities could requiring payment (money or user credits) commensurate in some way to the demand for the unit upon entry. Usage based pricing for can also be implemented for host customers of amenities. For example, a utilization-based pricing model for a rented portable bathroom could result in a host customer paying more for a higher utilization unit, and less for a low utilization unit, to account for differences in servicing costs. Usage of amenities can be automatically recorded through use of occupancy sensing schemes, door open and close counting, and data communication to the cloud.

In embodiments, the amenity can be programmed to enter a "high use" mode, based on an algorithm driven by recent frequency of use or other similar parameters, which may cause the amenity to behave differently than normal operations. In embodiments, high use mode would involve the door staying open in between uses, to move users more quickly in and out of the unit, only closing during use or occupancy by a user. In this embodiment the System would not authenticate users prior to entry, but the system may still request cleaning ratings or ask for post-use authentication.

Improper Amenity Use Rectification

Embodiments of the present disclosure can incorporate modules to detect and rectify overly long uses and improper uses (uses outside of access control and usage flow guidelines). In embodiments, an extended usage rectification module can include monitoring of real time usage duration through occupancy sensing module and triggering of a series of multi-modal notifications after a "normal use" period. The series of multi-modal notifications can begin in a low stress, low urgency way, and increase in obviousness and intrusiveness after specified time intervals. The notification modes can include one or more of a text message, internet message, an in-App message, blinking lights within the amenity, an audio notification through speakers in the amenity, an alert on a digital screen or user interface within the amenity, a powered door opening slightly, a powered door opening completely, and lights turning off.

One aspect of such an extended usage rectification module could include a dynamic timing module that starts extended use notifications after an amount of time that depends on predicted or expected utilization (e.g., a low use unit allows users to use the unit longer prior to initiating extended use rectification than a high use unit).

A second aspect of such a module are mechanisms that allow users to extend their use upon meeting certain criteria (similar to "a Snooze Button"). Criteria for extending use can include one or more of premium or specific usage accounts, a specified number of extensions per period of time, paid privilege, medical necessity, and marketing promotions.

In embodiments, an improper occupancy rectification module can detect when a user has entered an amenity outside of the typical access control and usage flow guidelines, such as by accessing an amenity without a user account or physical card. The improper occupancy rectification module can include automated firmware behavior of the unit to prevent normal usage when improper occupancy is detected. Prevented functionality can include one or more of non-functioning sink, toilet, and plumbing, lights not turning on, or blinking, HVAC not turning on, triggering an alarm, and locking the door in an open position.

Embodiments of the present disclosure provide a seamless amenity experience that leverages data collection techniques and user accountability to effectively improve the efficiency of servicing amenities while enhancing the user experience.

It should be understood that the individual operations used in the methods of the present disclosure, and particularly those represented by FIGS. 3-6, may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for managing a plurality of amenities comprising:

enabling a user at a particular amenity of the plurality of amenities to submit a request for access to the particular amenity with a user device having a phone number, the request comprising sending of a text message configured to be automatically generated on the user device in response to a user action;

receiving the request for access to the particular amenity of the plurality of amenities, the request indicating the particular amenity;

determining if the phone number is associated with an existing user profile;

generating a user profile including the phone number and an access status if the phone number is not associated with an existing user profile;

if the phone number is associated with an existing user profile, reviewing an access status for the existing user profile;

selectively providing access to the particular amenity based on the access status.

2. The method of claim 1, wherein the user action configured to cause the text message to be automatically generated is scanning of an indicia on the particular amenity with the user device.

3. The method of claim 2, wherein the indicia is a QR code.

4. The method of claim 1, wherein a recipient phone number is configured to be automatically populated on the user device in response to the user action.

5. The method of claim 4, where the request indicates the particular amenity based on the recipient phone number.

6. The method of claim 1, wherein a specific message is automatically populated on the user device in response to the user action.

7. The method of claim 6, wherein the request indicates the particular amenity based on the specific message automatically populated on the user device.

8. The method of claim 1, further comprising providing an indication of whether access has been granted.

9. The method of claim 8, wherein the indication of whether access has been granted is sent to the user device.

10. The method of claim 8, wherein the indication of whether access has been granted is provided at the particular amenity.

11. The method of claim 10, wherein the indication of whether access has been granted includes automatically opening a door of the particular amenity.

12. The method of claim 1, further comprising updating the user profile to include amenity use data for the particular amenity.

13. A method of accessing an amenity, comprising:

scanning an indicia corresponding to the amenity with a user device associated with a phone number to initiate a request for access to the amenity;

sending a text message that is automatically generated on the user device in response to scanning the indicia as the request to access the amenity, the request identifying a particular amenity from a plurality of amenities;

receiving an indication that access to the particular amenity has been provided or denied in response to the request.

14. The method of claim 13, wherein the indicia is a QR code.

15. The method of claim 13, wherein a recipient phone number is configured to be automatically populated on the user device in response to scanning the indicia.

16. The method of claim 13, wherein a specific message is automatically populated on the user device in response to the user action.

17. The method of claim 16, wherein the request indicates the particular amenity based on the specific message automatically populated on the user device.

18. The method of claim 13, wherein the indication of whether access has been provided or denied is received on the user device via the phone number.

19. The method of claim 13, wherein the indication of whether access has been granted is provided at the particular amenity.

20. The method of claim 19, wherein the indication of whether access has been granted includes automatically opening a door of the particular amenity.

* * * * *